(12) United States Patent
Jacot et al.

(10) Patent No.: US 12,330,254 B2
(45) Date of Patent: Jun. 17, 2025

(54) MACHINING MODULE AND MACHINE TOOL WITH A UNIT FOR DETECTING THE PROFILE OF THE TOOL, AND METHOD FOR DETECTING THE PROFILE OF THE TOOL

(71) Applicant: LDI Finances, Thyez (FR)

(72) Inventors: Philippe Jacot, Bevaix (CH); Sébastien Laporte, Thyez (FR)

(73) Assignee: WATCHOUTCORP SA, Yverdon-les-Bains (CH)

( * ) Notice: Subject to any disclaimer, the term of this patent is extended or adjusted under 35 U.S.C. 154(b) by 714 days.

(21) Appl. No.: 17/595,724

(22) PCT Filed: Jun. 3, 2020

(86) PCT No.: PCT/IB2020/055212
§ 371 (c)(1),
(2) Date: Nov. 23, 2021

(87) PCT Pub. No.: WO2020/245729
PCT Pub. Date: Dec. 10, 2020

(65) Prior Publication Data
US 2022/0250201 A1 Aug. 11, 2022

(30) Foreign Application Priority Data
Jun. 3, 2019 (CH) .................................. 709/19

(51) Int. Cl.
*B23Q 15/28* (2006.01)
*B23Q 17/22* (2006.01)
*B23Q 17/24* (2006.01)

(52) U.S. Cl.
CPC ......... *B23Q 15/28* (2013.01); *B23Q 17/2233* (2013.01); *B23Q 17/249* (2013.01)

(58) Field of Classification Search
None
See application file for complete search history.

(56) References Cited

U.S. PATENT DOCUMENTS

| 5,084,827 A | 1/1992 | Demesy et al. |
| 2006/0021208 A1 | 2/2006 | Pfau et al. |

(Continued)

FOREIGN PATENT DOCUMENTS

| CA | 2071764 A1 | 12/1992 |
| EP | 0377374 A1 | 7/1990 |

(Continued)

OTHER PUBLICATIONS

International Search Report for PCT/IB2020/055212 dated Jul. 24, 2020.

(Continued)

*Primary Examiner* — Ryan A Jarrett
(74) *Attorney, Agent, or Firm* — McDonald Hopkins LLC

(57) ABSTRACT

A material removing machining module for a machine tool including: a part support intended to receive a part to be machined, a control unit of the part support adapted to control and to modify the position of the part support in the machining module, a toolholder intended to receive a tool having an end portion used for machining the part; a control unit of the toolholder adapted to control and to modify the position of the toolholder in the machining module, a unit for detecting the profile of the tool mounted on the toolholder, which includes an optical system mounted on the toolholder for determining the profile of said end portion of the tool mounted on the toolholder.

14 Claims, 16 Drawing Sheets

(56) References Cited

U.S. PATENT DOCUMENTS

| | | |
|---|---|---|
| 2009/0051933 A1 | 2/2009 | Stimpson |
| 2014/0233839 A1 | 8/2014 | Morita et al. |
| 2014/0293039 A1 | 10/2014 | Appleyard |
| 2018/0111240 A1 | 4/2018 | Klugger et al. |
| 2020/0094374 A1 | 3/2020 | Beaucamp |

FOREIGN PATENT DOCUMENTS

| | | |
|---|---|---|
| EP | 2426555 A1 | 3/2012 |
| EP | 3021183 A1 | 5/2016 |
| FR | 2645782 A1 | 10/1990 |
| FR | 2952196 A1 | 5/2011 |
| JP | H07246547 A | 9/1995 |
| JP | 2012213840 A | 11/2012 |
| JP | 2018165730 A | 10/2018 |
| TW | 200810872 A | 3/2008 |
| TW | 201832031 A | 9/2018 |

OTHER PUBLICATIONS

Written Opinion for PCT/IB2020/055212 dated Jul. 24, 2020.
Translation of Office Action for corresponding Japanese application No. 2021-568989 mailed on Nov. 30, 2022.
Search Report issued in corresponding Taiwanese Patent Application No. 109116938; Mailing Date: Dec. 12, 2023.
Translation of an Office Action issued in corresponding Japanese Patent Application No. 2021-568989; Dated: Jun. 14, 2023.

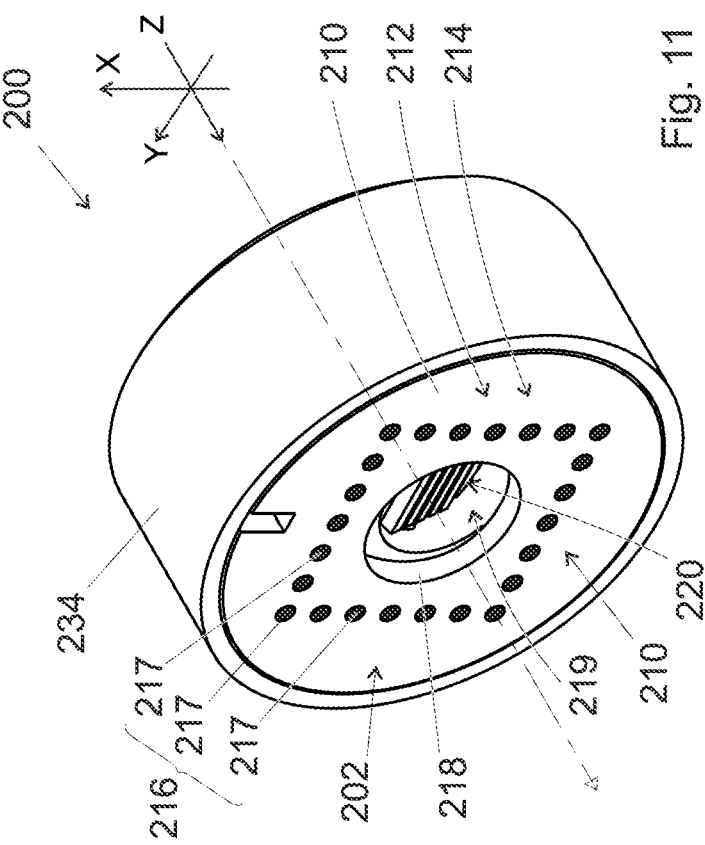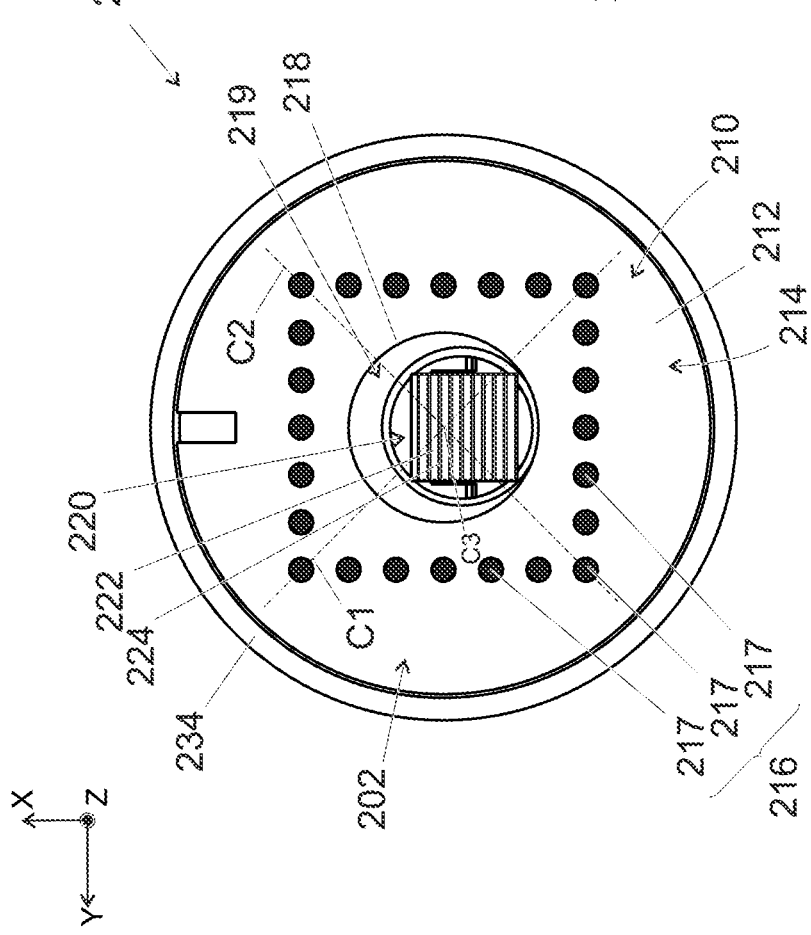

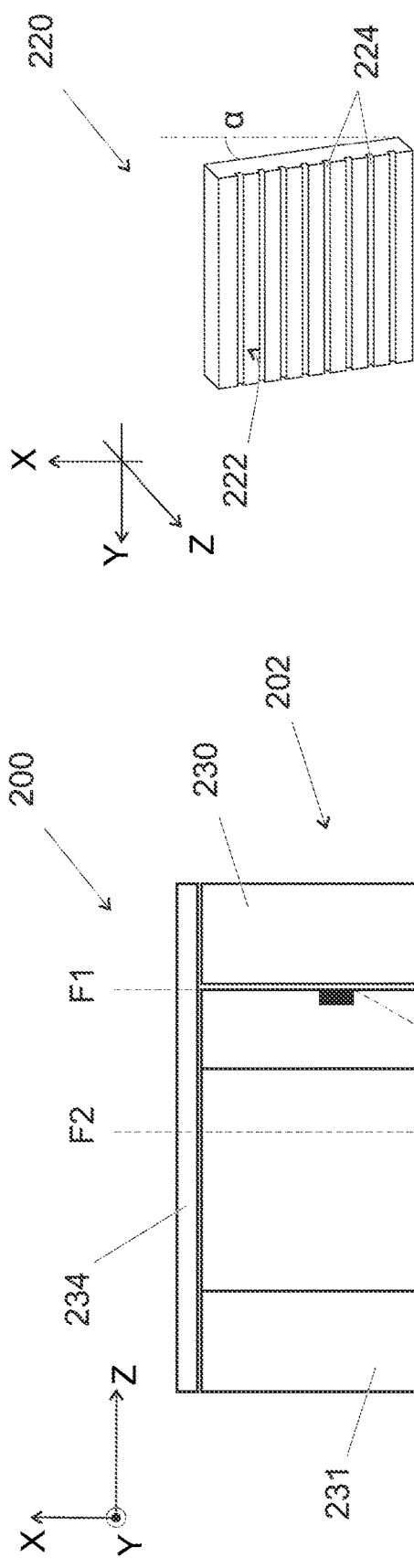
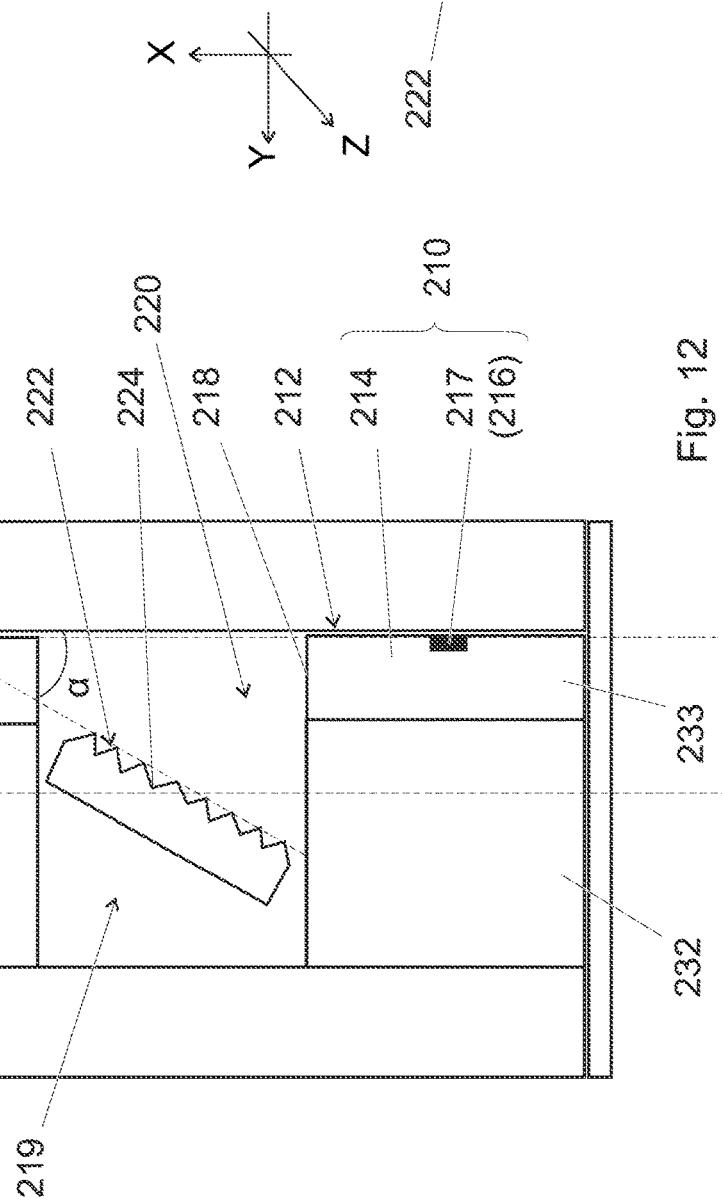
Fig. 13
Fig. 14
Fig. 12

MACHINING MODULE AND MACHINE TOOL WITH A UNIT FOR DETECTING THE PROFILE OF THE TOOL, AND METHOD FOR DETECTING THE PROFILE OF THE TOOL

TECHNICAL FIELD

The present invention concerns the field of machine tools. The present invention also concerns the field of optical detection of the position of a tool in situ in a machining module, and in particular in a machine tool. The present invention also concerns the field of optical detection of the profile of a tool in situ in a machining module, and in particular in a machine tool. It is a question in particular of a machine tool forming a machine that machines by removing material and in particular for a rotational machining step (turning, bar turning . . . ), including a numerically controlled machine tool.

In the machine tool field there exists a need to know precisely the position of a tool mounted on the toolholder. It is also useful to know the evolution of the wear of that tool. This information is useful in order to ensure a machining range conforming to the machining plan developed during setting.

The manufacture of parts by means of machining modules (machine tools), in particular croppers, automatic lathes, turning-milling centres, milling machines, machining centres and transfer machines, typically includes three distinct phases:

In a first or setting (or pre-adjustment) phase, the operator (for example a bar turner) defines and tests on a machining module the machining plan, that is to say the succession of operations and spindle movements necessary to obtain the required machined part. The operator aims for example to obtain the most effective machining plan possible, that is to say that which enables a given part to be machined with a minimum of operations and avoiding collisions between tools or with the part. They choose the tools to be employed and verify the quality of the parts obtained, for example surface states, compliance with tolerances, etc.

In a second or production phase, a series of parts is produced on the machining module pre-adjusted using the parameters defined during setting. This phase is the only productive phase; it is often carried out 24/7, the machining module being fed with raw material by means of a feeder or a slug (unfinished part) loader.

It can happen that the production of a series of parts is interrupted, for example to replace worn tools, to produce another type of part on the same machining module, for maintenance of the machine, etc., and then subsequently resumed. In a situation of this kind, a starting up phase is necessary to apply the parameters defined previously during setting up. This starting up is faster than setting up.

During starting up it is often necessary to replace the tools mounted on the machine with another set of tools appropriate for the machining that has to be effected. The precise position and the level of wear of these tools determine the quality of machining, but these parameters are difficult to reproduce during successive start ups.

Moreover, during the production phase, it is not impossible for there to occur, as and when new parts are machined, and in particular in the case of long production runs, positional drift between the toolholder and the part support, drift caused in particular by thermal expansion of the machines. Moreover, knowing the wear of the end portion of the tool that is used for machining, forming the cutting zone and comprising one or more cutting edges, is decisive for maintaining machining quality. The evolution of this wear, generally called the wear rate, but which in reality encompasses different wear processes, sometimes present in combination, is often never monitored and if it is monitored it is by means of an ancillary installation, which necessitates additional time for this monitoring and for demounting/remounting the tool in the machining module.

Consequently, during the machining process, not only the use of worn tools not suitable for the required machining of a part and even breaking of cutting tools and monitoring wear in a dedicated system separate from the machining module bring about effects that are detrimental to productivity and to the cost-effectiveness of the production systems.

It is important to be able to preserve the machine parameters resulting in strict compliance with the specifications of the part to be machined, optimizing the percentage of the production time of the machine tool and also optimizing the time of use of each tool. In practice, the sequences of instructions controlling the machine tool are not revised, or are revised only on a one-off basis, whereas, throughout its time of use, the end portion of the tool suffers progressive evolution of its profile modifying the geometry and the position of the cutting edges.

There exist numerous scenarios of the evolution of the profile of the wear of the tool during its use: there may be cited for example relief wear (strip of wear on front face), nick wear, crater wear, wear generating plastic deformation (depression or protrusion), formation of a built-up edge, wear creating spalling outside the cutting zone, spalling of the cutting edge, wear generating a thermal crack, breaking of the cutting edge, . . . .

It may be beneficial to evaluate the wear of the tool not only through the loss of material over its cutting zone but also by monitoring the evolution of the shape of its profile in order to anticipate the type of wear encountered and therefore to modify one or more different machining and/or positioning parameters of the machine tool as a function of the type of wear encountered. For example, in the case of nick wear the choice may therefore be made to modify the cutting depth whereas in the case of wear by plastic deformation the decision may be taken to increase the rate of spraying the cooling liquid.

PRIOR ART

Some empirical solutions recommend replacement of the tool after a given number of machined parts. Not only do these solutions not optimize the cost-effectiveness of the production tool, above all in the case of special tools, that are costly or difficult to obtain, but moreover they do not guarantee the untimely breaking of a tool or the harmful consequences of its wear on the quality of the manufactured part.

There exist systems for evaluating or measuring cutting tool wear by means of feelers (with contact) or without contact (visual, laser or electric field detection) in order to validate the integrity or the receivability of the cutting tool (for example a milling tool or a drill). These checks are effected outside the machining process and module, which generates a period of time with no production, incompatible with the requirements of long production runs. Techniques of this kind are described in the documents US2006021208, CA2071764A1, US2014233839 and FR2952196.

There may further be cited monitoring systems for identifying the breaking of a tool based on measurement by sensors of signals transmitted by the machine tool, in particular acoustic measurement or force measurement (force, torque, effective power . . . ) on mechanical parts such as cam levers or spindles of the machines. By comparing the detected signal (vibration, noise, pressure . . . ) with a model signal previously stored by the monitoring system during a normal machining cycle it is possible to trigger an alert signal if the recorded signal departs too much from the model signal.

The document US2018111240 describes a solution wherein the contactless measuring device uses a light barrier extending between a light emitter element and a light receiver element to detect the position of a rotary machining tool. Because of the proximity of the active portion of the tool and the light emitter and receiver elements, this technology requires protection means, in particular so as not to damage said light emitter and receiver elements with the oil and the chippings present in the environment near the tool. Moreover, this system makes it possible to know whether the tool is touching the light barrier or not but gives no information on the precise position or the profile of the end portion of the tool.

The document FR2645782 describes a system for monitoring tool breakages in a machining centre equipped with a numerically controlled machine tool. Two video cameras produce views of the tool before and after machining and comparison of the images makes it possible to detect an anomaly affecting the tool. The document EP3021183 proposes a device integrated into a machine tool for monitoring and correcting the position of the cutting edge of a tool on the toolholder via a video camera. However, these installations necessitate recourse to an additional frame of reference in the machine tool, namely a frame of reference specific to the video camera, enabling location of the video camera in the machine tool and from there relative to each of the parts of the machine tool. An arrangement of this kind potentially generates additional errors in respect of the position of the tool, in particular relative to the part to be machined.

EP0377374 provides a system for locating the position of a machining tool relative to the machine tool. A camera is used that compares two perpendicular images of a block template of known position with corresponding, subsequently displayed images of the tool system.

EP2426555 discloses an apparatus for detecting the movement of a cutting tool relative to a workpiece. This apparatus includes a camera that is fixedly mounted in a portion of the machine tool that also includes the workpiece mounted on a chuck and the tool holder.

Also, reference can be made to JPH07246547 which uses a detection system for detecting the coordinates of a tool, which is composed of a reflector installed on a tool mounting shaft and a measuring device of the type comprising laser interferometers for detecting the coordinates of the tool.

It emerges from the foregoing that there exists a need for enhanced (more regular, faster and/or more precise) determination of the profile of the end portion (active machining portion) of a tool in use during machining by removal of material.

BRIEF SUMMARY OF THE INVENTION

One object of the present invention is to propose a machining module able to determine the profile of the end portion of a tool mounted on the toolholder of a machining module.

Another object of the invention is to be able to determine rapidly the position or the profile, or both the position and the profile, of the end portion of a tool mounted on the toolholder. The aim is therefore to propose a solution enabling determination of the profile (the position) of the end portion of the tool without demounting the tool or the toolholder so as not only to waste time but above all not to modify the positioning references of the tool in the toolholder and of the toolholder in the machine tool.

Another object of the present invention is to propose a machining module free of the limitations of known machining modules.

In accordance with the invention, the above objects are achieved in particular by means of a material removing machining module for a machine tool comprising:
  a part support intended to receive a part to be machined,
  a control unit of the part support adapted to control and to modify the position of the part support in the machining module,
  a toolholder intended to receive a tool having an end portion used for machining the part mounted on the part support;
  a control unit of the toolholder adapted to control and to modify the position of the toolholder in the machining module,
  a unit for detecting the profile of the tool mounted on the toolholder, said detection unit comprising an optical system for determining the profile of said end portion of the tool mounted on the toolholder, wherein said optical system is mounted on the part support.

This solution has in particular the advantage compared to the prior art that the means for measuring and detecting the end portion of the tool are in situ in the machining module, therefore in the machine tool. One of the advantages of this configuration resides in the fact that, the end portion of the tool being measured or imaged locally where the machining operations take place, the resulting measurement or image actually corresponds to the instantaneous reality of the shape/geometry/position of the end portion of the tool with no artefacts. Accordingly, if the tool suffers deformation caused by the local temperature of the machining module, this thermal drift is taken into account, whereas in the case of recourse to a measuring module separate from the machine tool the tool will have cooled and the measurement will include an artefact caused by the change of temperature. Another advantages resides in the fact that since the optical system is attached to the part support, all of the spatial referencing between the part support and the toolholder serves as referencing between the optical system and the tool as seen by the optical system: this prevents the measurement artefact caused by the change of frame of reference occurring if the tool/toolholder is installed in a measuring module separate from the machine tool.

In fact, said detection unit forms a unit for measuring the profile and therefore the wear of the tool that is integrated into the machining module. This arrangement enables monitoring of the wear of the tool in situ, that is to say in the machining module itself, and therefore without demounting the tool from the toolholder and without contact with the tool. To this end said detection unit is disposed in the machining module, in particular in the vicinity of the toolholder. Additionally, it is clear that placing the optical system adapted to view the end portion of the tool mounted on the toolholder directly on the part support, i.e. the part support element, enables an improvement in particular in terms of processing time (the optical system is already positioned to detect the end portion of the tool) and of precision (the position of the optical system in the toolholder being known precisely and fixed, no error linked to the determination of the relative position between the optical system and the toolholder is added to the determination of the relative position between the optical system and the end portion of the tool).

In the present text, the expression "part support" is to be understood as meaning "machine tool module comprising elements enabling mounting and retention (in particular clamping) and demounting of the part to be machined, as well as movement of the part to be machined within the space of the machining module of the machine tool". This part support is generally called the "material spindle". Also, in the present text, the expression "toolholder" is to be understood as meaning "machine tool module comprising elements enabling mounting and retention (in particular clamping etc.) and demounting of one or more tools and movement of that tool or those tools in the space of the machining module in the machine tool".

Thus it will not be necessary to base the decision to replace the cutting tool and/or to change the cutting parameters only on mathematical models representing the law governing wear of the cutting tool and possibly experimental curves, which are not always available, or at least existing throughout the range of parameters present. Thanks to the invention, it will moreover be possible to increase the range explored and therefore the library of experimental curves by integrating, for example into a database, profile measurements effected with the machining module according to the invention.

It is therefore possible to customize the optimization of the time of use specific to each tool, even in a series of similar tools. For example, it will be possible to shorten the time of use of a tool if the parameters of evolution of its wear exceed a predefined limit, in particular because in reality the evolution of the wear of the tool is more unfavourable than the theoretical wear model, or to lengthen it if the wear evolution parameters do not exceed the predefined limit because in reality the wear of the tool is less unfavourable than the theoretical wear model.

In one embodiment the optical system is part of a measuring optical device that is configured to enable through a single step of imaging by the optical system determination of the three-dimensional relative position between the support of the part to be machined and the toolholder. In particular, the optical system images the toolholder, for example a specific zone of the toolholder, and according to one possibility the optical system images a target mounted on the toolholder and forming a positioning reference.

The present invention also relates to a machine tool including a machining module as described in the present text, said machine tool further including a unit for monitoring wear of the tool that is able to calculate the deviation of the profile of the tool on the basis of information supplied by said detection unit. This is using the machining module to analyse the state of the tool and in particular the wear thereof.

It is therefore clear that, based on the detection unit and on information supplied as to the state of the tool carrying out machining, it is therefore possible to analyse the state of the tool, its level of wear and/or its shape drift, in particular where the cutting zone is concerned.

The invention also relates to:
a method for detecting the position of a tool,
a method for detecting the profile of a tool, and
a method for detecting wear of a tool in a machine tool, that tool being mounted on a toolholder in a machining module including a part support and a toolholder.

These methods will be explained and described further in the detailed description.

BRIEF DESCRIPTION OF THE FIGURES

Embodiments of the invention are indicated in the description illustrated by the appended figures, wherein:

FIGS. 10, 11 and 12 are three views showing the structure of the three-dimensional target, respectively from the front, in perspective and in section, and FIGS. 13 and 14 are perspective views of the second structure of the target respectively as in FIGS. 10, 11 and 12 and in accordance with a variant embodiment.

EMBODIMENT(S) OF THE INVENTION

Figure 1:
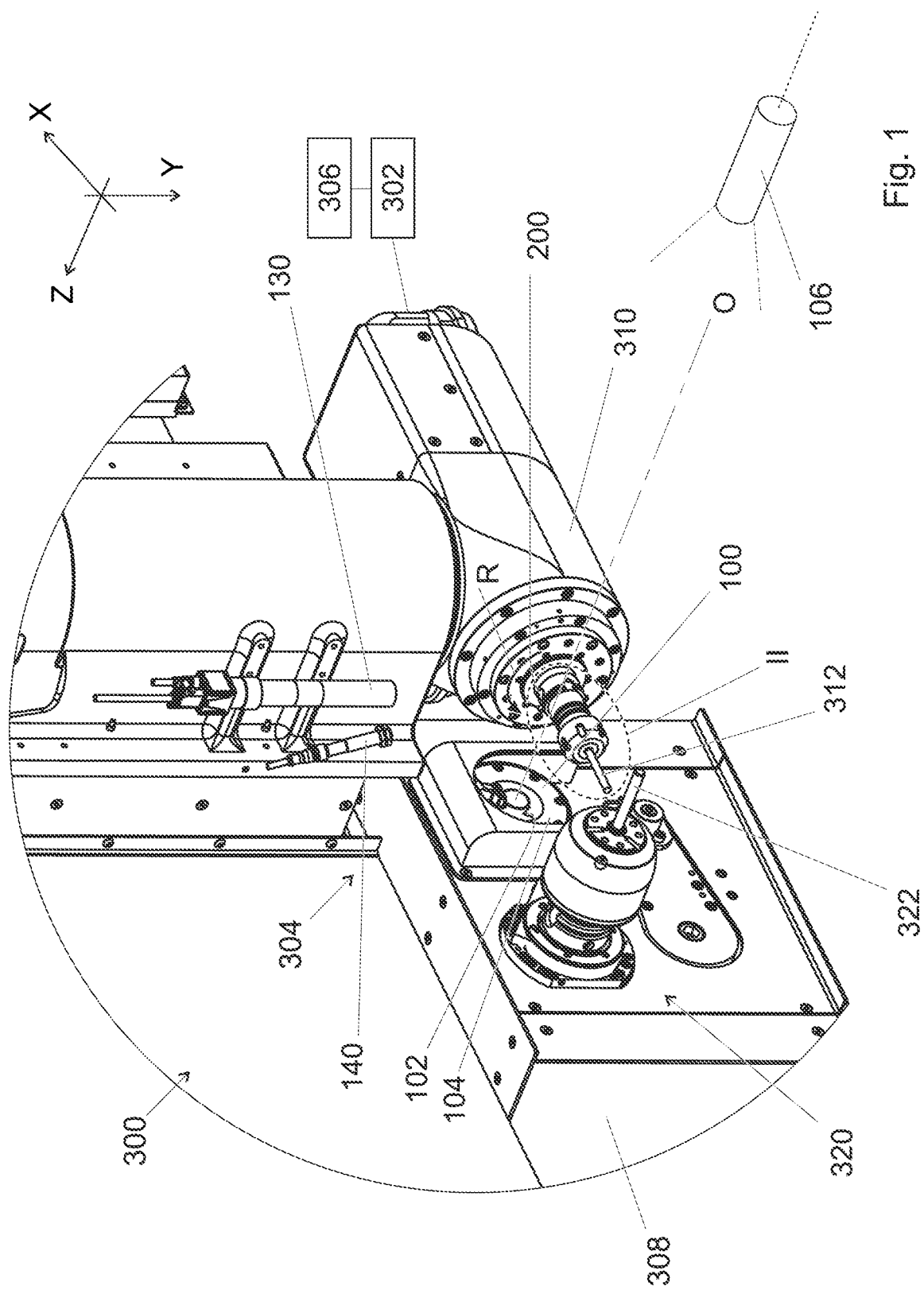
FIG. 1 shows in perspective a machining module in accordance with one embodiment of the invention.

Referring to FIG. 1, the machining module 300 includes a part support 320 and a toolholder 310. The part support 320 can be designed to be mounted in a removable manner on the machining module 300, in particular via removable fixing means. As seen in FIG. 1, removably mounted on the part support 320 is a part 322 to be machined (here an unmachined bar or an unfinished part is represented). The part support 320 includes what is known as a material spindle, comprising, for example, a clamp, a chuck, a bar turning bushing or a pallet or palletholder. The main direction of the part support 320 corresponds to the direction Z. The toolholder 310 may be designed to be mounted in a removable manner on the machining module 300, in particular via removable fixing means. As seen in FIG. 1, removably mounted on the toolholder 310 is a tool 312 (a tap or a milling tool is represented in a simplified manner). The toolholder 310 includes for example a spindle, a carriage or a vice or again a chaser. The main direction of the toolholder 310 corresponds to the direction X. In the machining module 300 the vertical direction corresponds to the direction Y and the three directions X, Y and Z form an orthogonal system of axes.

A toolholder control unit 302 is able to control and to modify the position of the toolholder 310 in the machining module 300. In the field of mechanical fabrication and in the present text the term "control" designates all of the hardware and software elements having the function of issuing movement instructions to all the elements of a machine tool. The machining module 300 also includes a control unit (not represented) of the part support 320.

The machining module 300 further includes a detection unit 304 enabling detection of the position and also of the profile of the tool 312 mounted on the toolholder 310. To this end, said detection unit 304 includes an optical system 100 for determining the profile of the end portion 313 of the tool 312 mounted on the toolholder 310 (see FIGS. 4, 6 and 8). The optical axis O of this optical system 100 extending from the entry face 102 of the optical system is represented in FIG. 1. In the FIG. 1 arrangement this optical axis O is parallel to the direction Z or main direction of the part support 320. The optical axis O is preferably also orthogonal to the direction of the axis X of the toolholder 310, as represented in FIG. 1. In accordance with the invention, as represented in FIG. 1, there are mounted on the part support 320 the optical system 100, at the least all of the sensor part of the optical system 100, and lighting members that can be detached from the sensor part of the optical system 100 and therefore placed elsewhere in the machining module 300.

As will be explained hereinafter, this is an imaging optical system 100, that is to say an optical system able to generate an image of the profile of the tool via an image capture system included in the optical system 100. In particular, this optical system 100 includes a set of optical components and an image acquisition system. An image acquisition system of this kind enables capture of photographic and/or video images and is for example a video camera or a still camera, in particular a digital still camera. In the context of the present invention, there is considered an optical system 100 that functions in conjunction with one or more light sources. Also, it is clear that the image capture system of the optical system 100 according to the invention forms an image sensor. The light source or sources associated with the image capture system of the optical system 100 form an emitter or emitters of electromagnetic radiation, or luminous radiation, which may be monochromatic, or extending over a range of wavelengths by combining a series of monochromatic electromagnetic radiation (multichromatic light).

In one embodiment the aforementioned light source or sources is not (are not) a source (sources) of laser radiation and the image capture system of the optical system 100 according to the invention forms an image sensor that does not include or is not associated with a laser emitter.

Figure 2:
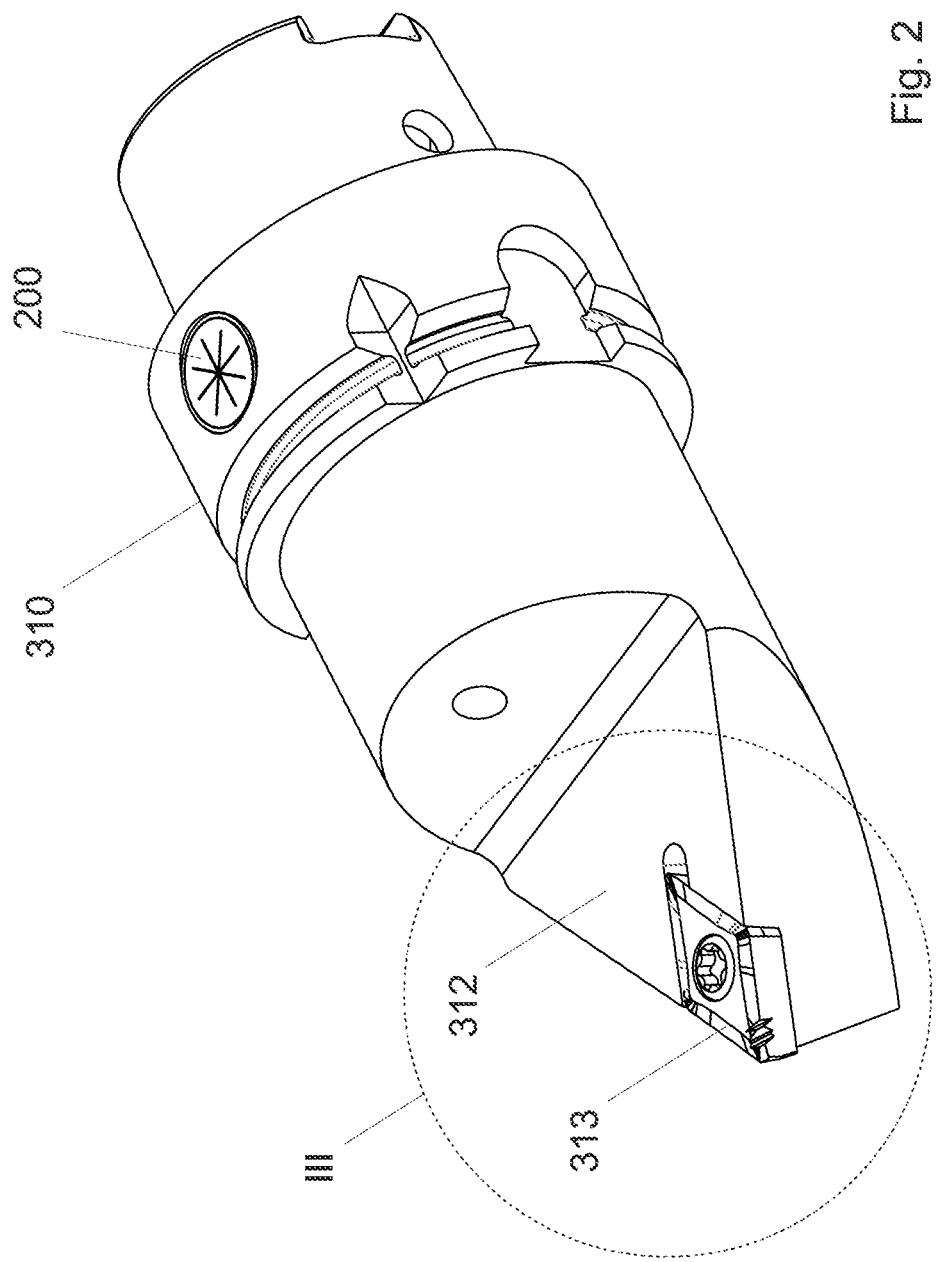
FIG. 2 shows in perspective and to a larger scale the portion II from FIG. 1, showing a different tool mounted on the toolholder.
Figure 3:
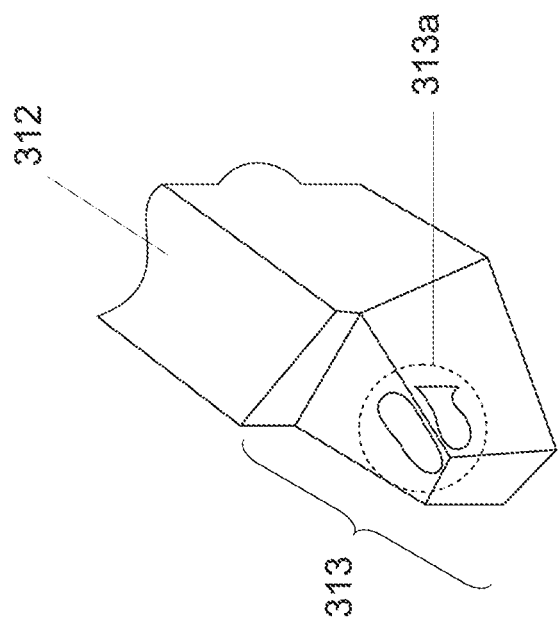
FIG. 3 shows in perspective and to a larger scale the end portion of the tool seen in the portion Ill of FIG. 2 that is used to machine a part in a damaged configuration following wear.

In the present text, by "end portion of the tool" is meant the terminal part of the tool that includes the zones used for machining, and therefore the cutting zone or zones that include(s) the cutting edges defined by the intersections between the active faces and the edges. FIG. 2 shows to an enlarged scale an end portion 313 of this kind for the tool 312. In FIG. 3 an example of wear of the end portion 313 of a tool other than that from FIG. 2 can be seen through the wear zone 313a divided between the relief face and the cutting face.

In the present text by the end portion "profile" is meant either a two-dimensional representation of the end portion or a three-dimensional representation of the end portion. For example, this profile may include a line corresponding to the contour of the end portion of the tool, projected onto a plane or forming an intersection with a plane, in particular a plane orthogonal to the optical axis O of the optical system 100. Also, this profile may form a three-dimensional shape of the end portion 313 of the tool (for example a small plate) including the cutting edge or edges. Also, this profile may correspond to a three-dimensional shape of the end portion 313 of the tool represented by a series of lines like a topographical profile.

Figure 4:
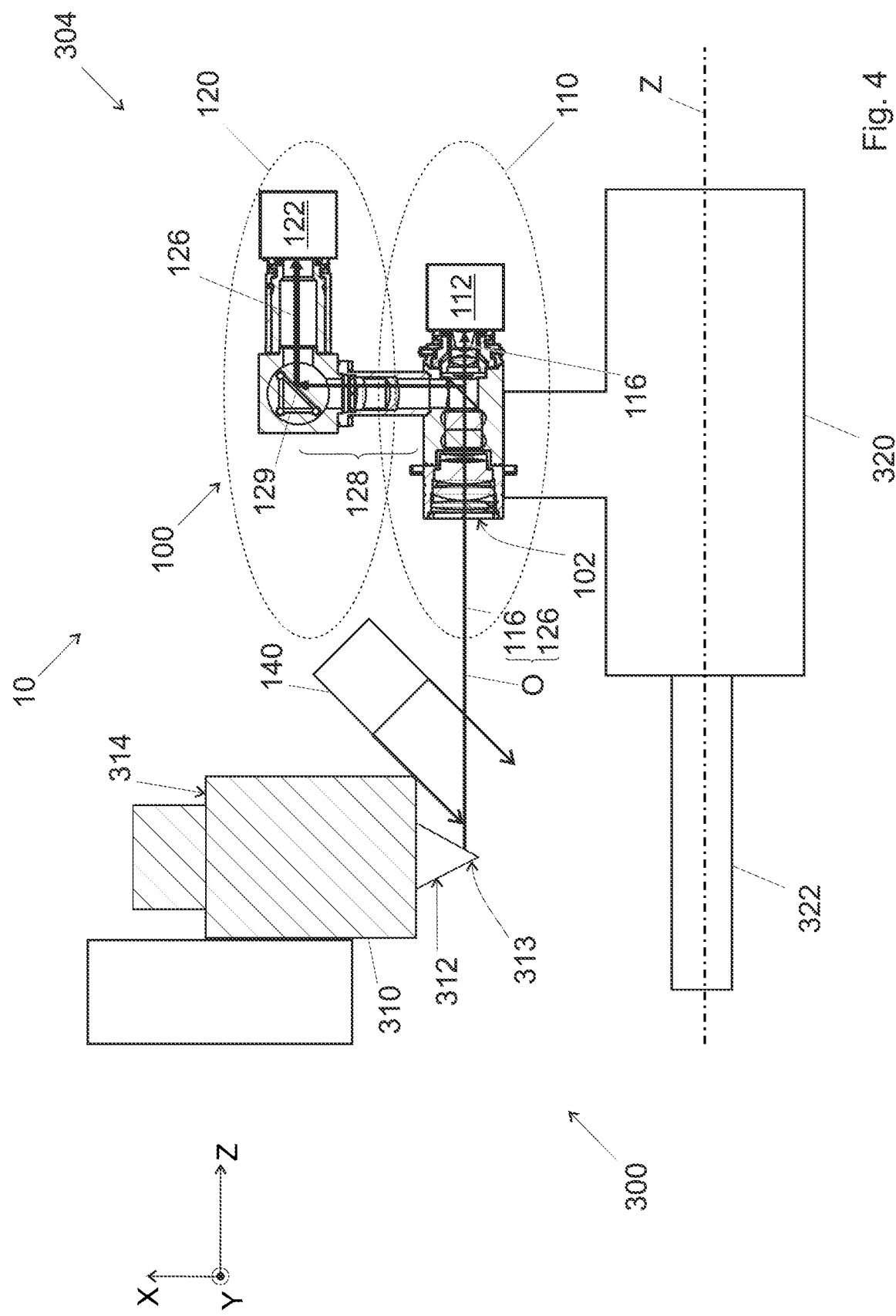
FIG. 4 shows the use of the optical system of the machining module to determine the position and/or the profile of the tool in the toolholder.

The optical system 100 is configured to enable detection of the profile of the end portion 313 of the tool 312 when the toolholder 310 is in a measuring operational position represented in FIG. 4. In this operational measurement position the toolholder 310 and the part support 320 are close to one another. In this measuring operational position the optical axis O of the optical system 100 may intersect the end portion 313 of the tool 312 or the tool 312 or be at least sufficiently close to the tool 312 for the tool 312 to be in the field of view of the optical system 100. In other words, in this case, in this measuring operational position the end of the toolholder 310 is in line with the exit (or entry face 102) of the optical system 100. This means that the optical path from the optical system 100 intersects the end of the toolholder 310 and/or the tip or more generally the end portion 313 of the tool 312.

In some cases, in the measuring operational position, the shortest distance between the end portion 313 of the tool 312 and the axis Z of the toolholder is less than 50 cm, or even less than 30 cm, and sometimes less than 15 cm. For example, in the measuring operational position, the shortest distance between the end portion 313 of the tool 312 and the axis Z of the part support is therefore between 5 and 50 cm inclusive, sometimes between 5 and 30 cm inclusive, or between 20 and 30 cm inclusive or between 5 an 15 cm inclusive.

In some cases said operational measuring position corresponds to a position for loading a tool 312 onto the toolholder 310: the profile can therefore be measured as soon as the tool 312 is mounted.

Also, in said measuring operational position, the axis X of the toolholder 310 may have different orientations relative to the optical axis O of the optical system 100:

in some cases, the axis X of the toolholder 310 is orthogonal to the direction of the optical axis O of the optical system 100, as represented in FIG. 1, so that the optical system 100 sees one side of the end portion and of the tip of the tool 312, in some cases, the axis X of the toolholder 310 is coaxial with or parallel to the direction of the optical axis O of the optical system 100 (this situation is not represented), so that the optical system 100 sees only the tip of the tool 312, in other cases, the axis X of the toolholder 310 is inclined relative to the optical axis O of the optical system 100

(this situation of a non-zero angle other than 90° between the axes X and O is not represented).

In fact, depending on the machine tool carrying the machining module 300 according to the invention, the orientation of the toolholder 310 and of its axis X may be changed, in particular in the case of a machine tool with five or six axes of movement for the toolholder 310.

Refer now to FIG. 4 representing one embodiment of the optical system 100. The optical system 100 includes a first image capture system 110 that is configured so that its image focal plane is able to intersect the end portion 313 of the tool 312 in said measuring operational position. Moreover, the first image capture system 110 includes a first image acquisition system 112 enabling an image to be captured of the end portion 313 of the tool 312 in the measuring operational position. In FIGS. 1 and 4 there is also seen a lateral light source 140 close to, possibly mounted on, the toolholder 310 in order to provide lateral illumination of the end portion 313 of the tool 312 in the measuring operational position. Other types of light source or additional light sources may be provided independently of one another or complementing one another.

Figure 7:
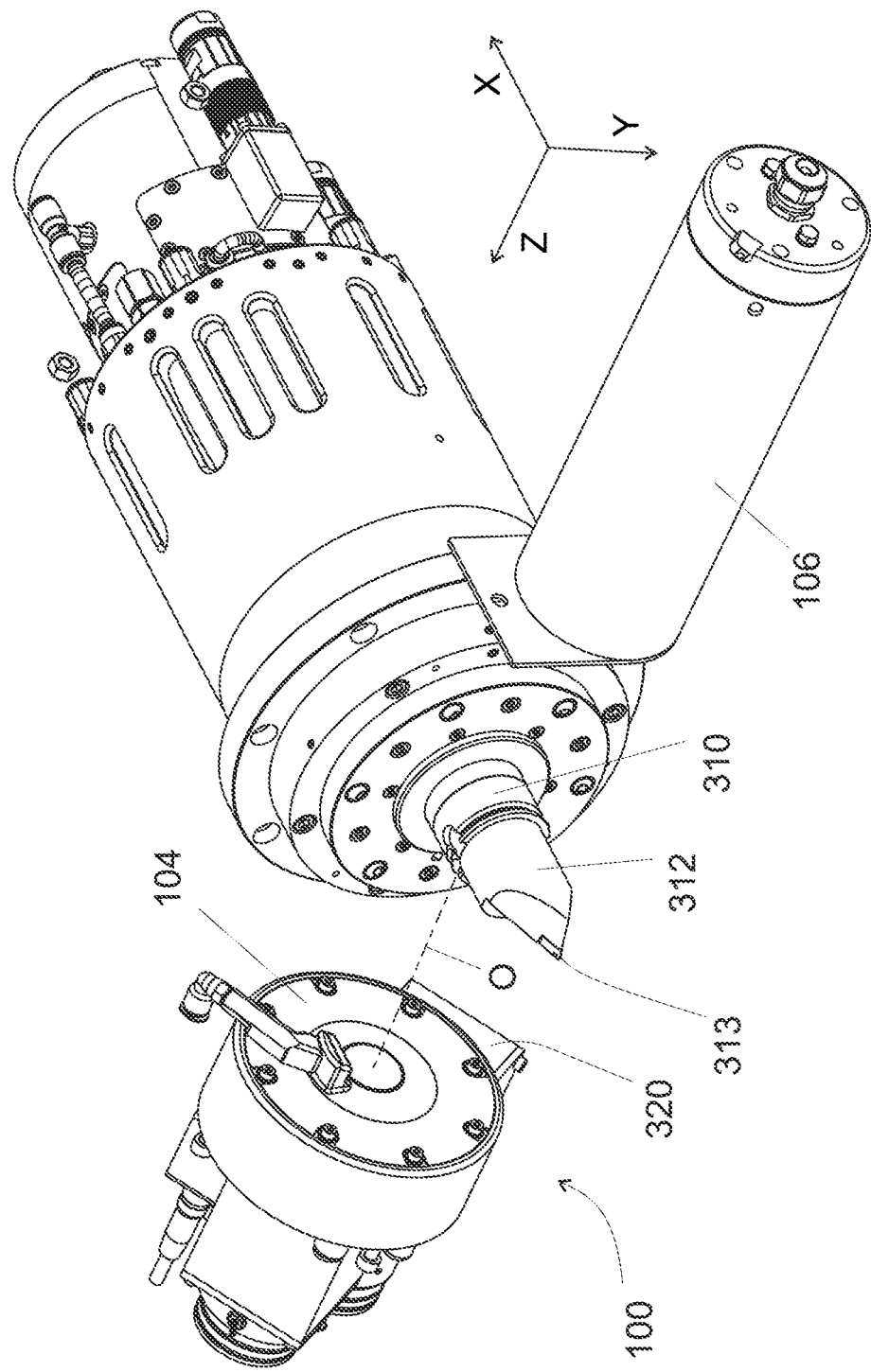
FIG. 7 is another perspective view corresponding to FIG. 6.
Figure 16:
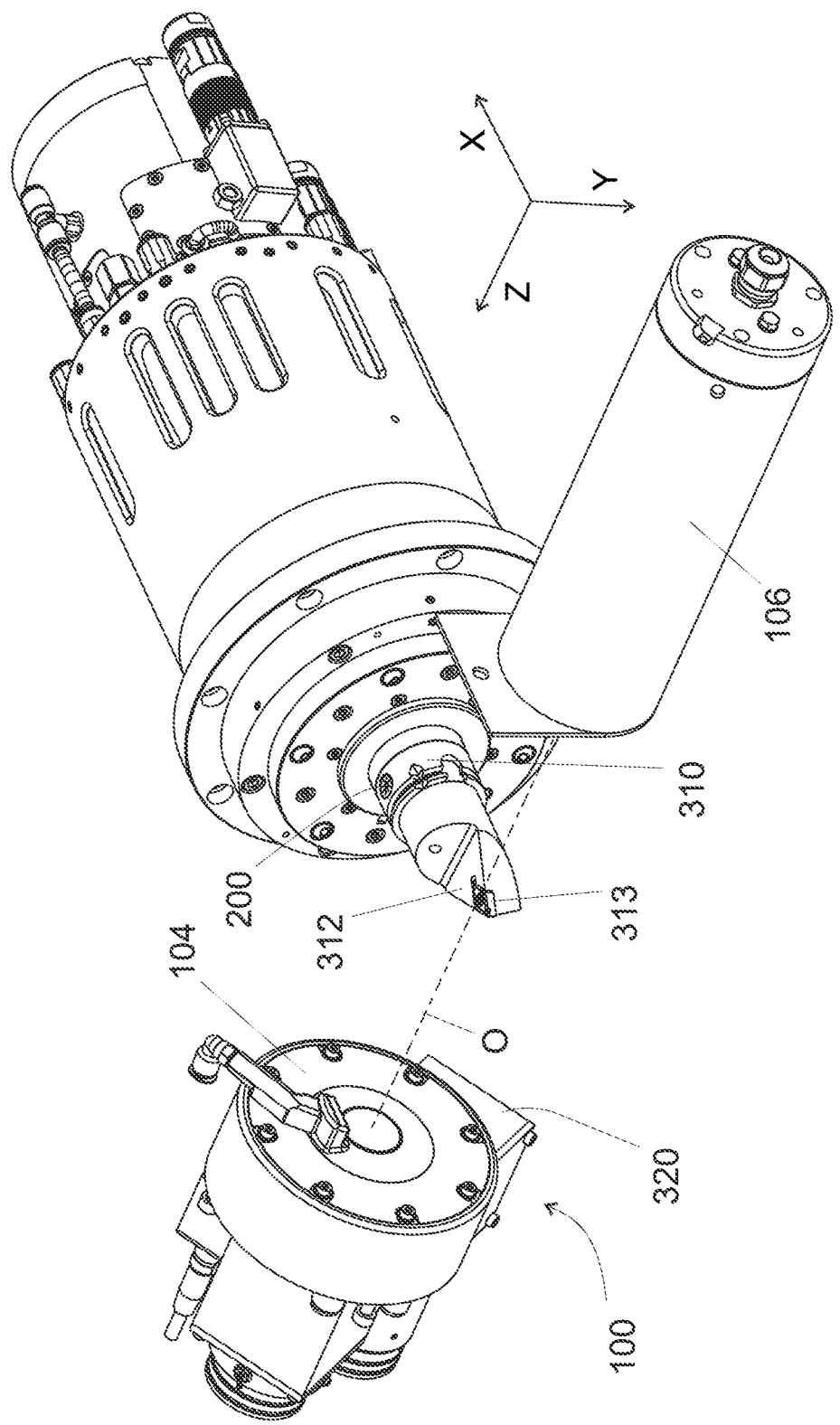
FIG. 16 is another perspective view corresponding to FIG. 4 and showing the use of the optical device of the machining module to determine the profile of the end portion of the tool.

In one embodiment (see FIGS. 1, 7 and 16), the optical device 10 further includes a front light source 104 oriented parallel to the optical axis O of the optical system 100 and in the direction of the toolholder 310. This light source 104 may be disposed in the vicinity of the optical system 100. This light source 104 is oriented in the direction of the tool 312 in order to provide front illumination of the end portion 313 of the tool 312 in the measuring operational position. In particular, as seen in FIGS. 1, 7 and 16, this front light source 104 is an annular light source surrounding the entry face 102 of the optical system 100: in this case, the front light source 104 is coaxial with the optical axis O of the optical system 100. This front light source 104 enables good lighting of the surface of the end portion 313 of the tool seen by the optical system 100.

In one embodiment (see FIGS. 1 and 16), the optical device 10 further includes a rear light source 106 oriented in the direction of the optical system 100. This light source 106 is disposed in order to provide rear ("back face") illumination of the end portion 313 of the tool 312 relative to the optical system 100 in the measuring operational position. In particular, as seen in FIGS. 1 and 16, this rear light source 106 is coaxial with, preferably in line with, the optical axis O of the optical system 100. In the measuring operational position (see FIG. 16) the end portion 313 of the tool is located between the entry face 102 of the optical system 100 and the rear light source 106 so that the end portion 313 of the tool is illuminated from behind, which enhances the contrast of the image captured in the zone of the contour of the end portion 313 as seen by the optical system 100.

The optical system 100 also includes a second image capture system 120 with a second image acquisition system 122 and also enables capture of an image of the end portion 313 of the tool 312 in the measuring operational position. To this end, the optical path of the first image capture system 110 and the optical path of the second optical image capture system 120 have a common optical path portion that is directed toward and comes from the object viewed by the optical system 100, in this instance the end portion 313 of the tool 312 (see FIGS. 4 and 16). In another measuring configuration that will be described with reference to FIGS. 6 and 8, it is a target 200 mounted on the toolholder 310 that forms the viewed object seen by the optical system 100. Hereinafter by "viewed object" is meant in particular either the end portion 313 of the tool 312 mounted on the toolholder or the target 200. In the measuring operational position the first image capture system 110 faces in the direction of the viewed object and forms an image capture system aligned with the viewed object and the second image capture system 120 has an optical path 126 that joins the optical path 116 of the image capture system 110 aligned with the viewed object and forms an image capture system that is eccentric with respect to the viewed object relative to the optical axis O of the optical system 100 and relative to the common portion of the optical paths 116 and 126 (aligned with the viewed object). The optical axis O is superposed on the mean radius of the common portion of the first optical path 116 and the second optical path 126. In this common portion the sections of the first optical path 116 and of the second optical path 126 are parallel to one another but not necessarily superposed.

In the common portion of the optical paths 116 and 126 the optical rays coincide at least in part or are merely parallel to one another. The eccentric second image capture system 120 has an optical path portion 126 internal to this second image capture system 120 that is preferably parallel to the optical axis O. This internal portion of the optical path 126 is connected to, or to be more precise joins, the optical path 116 of the first image capture system 110 aligned by a dedicated optical module 128 including a catadioptric optical system such as a mirror 129. In this way the entry of the eccentric image capture system (here the second image capture system 120) is connected to the path or optical path of the aligned image capture system (here the first image capture system 110).

Thus the optical system 100 includes an optical module 128 (for example including a catadioptric optical element such as a mirror 129) disposed between the first image capture system 110 and the second image capture system 120 and configured to divert some of the light rays passing through at least a part of one of the first and second image capture systems to the other of the first and second image capture systems. The optical system 100 is such that the optical path from the object (the end portion 313 of the tool 312 in FIGS. 4 and 16 and the target 200 in FIGS. 6 and 8) viewed by the optical system 100 passes through at least a portion of the first image capture system 110 or the second image capture system 120 (the first image capture system 110 in FIGS. 4, 6, 8 and 16) before reaching the other of the first image capture system 110 and the second image capture system 120 (the second image capture system 120 in FIGS. 4, 6, 8 and 16).

Also, in the configuration represented, the first image capture system 110 and the second image capture system 120 are disposed in parallel with one another. Also, in the configuration represented, the first image capture system 110 is mounted directly on the part support 320 and the second image capture system 120 is eccentric relative to the optical axis of the first image capture system 110 but the opposite could apply, namely there could be a configuration wherein the second image capture system 110 is mounted directly on the part support 320 and the image capture system 120 is eccentric with respect to the optical axis of the first image capture system 110.

In this way it is clear that when the first image capture system 110 is aligned with the viewed object the second image capture system 120 also sees the viewed object and is also able to image it and to generate an image of that viewed object. As will now be explained, this image may be used to determine the position of the tool 312 and to determine the profile of the end portion of the tool 312.

Thus in one embodiment of the invention there is proposed a method of detecting the position of a tool 312 mounted on a toolholder 310 in a machining module 300 including a part support 320 and a toolholder 310 including the following steps:

i) providing a detection unit 304 in the machining module 300, said detection unit 304 including an optical system 100 for determining the profile of said end portion 313 of the tool 312 mounted on the toolholder 310, wherein unit the optical system 100 is mounted on the part support 320, ii) loading the tool 312 into the toolholder 310: this step determines the relative position between the tool 312 and the toolholder 310, iii) positioning the toolholder 310 relative to the part support 320 in a measuring operational position (for example in accordance with the FIG. 4 configuration): this step enables placing of the tool 312, and in particular of the end portion 313 of the tool 312 or of some other portion of the tool 312, in a manner visible to the optical system 100, iv) activating said detection unit 304, and v) via the optical system 100, determining the position of the tool 312 in the machining module 300.

At this stage it is necessary to point out again that in the case of the arrangement of the machining module 300 in accordance with the invention as shown in the figures said optical system 100 is mounted on the part support 320. It is therefore clear that as a result imaging by the optical system 100 of the tool 312 (and in particular of its end portion 313) enables determination not only of the relative position between the tool 312 (said end portion 313 of the tool) and the part support 320 but also of the relative position between the toolholder 310 and the part support 320.

According to a first possibility concerning said method of detecting the position of the tool, upon activation of the detection unit 304 it is the first image capture system 110 that is used and it is therefore the first image acquisition system 112 that generates one (or more) image(s) of the end portion 313 of the tool 312. The analysis of this image and in particular of the position of the sharply focussed zone of this image (resulting for example from the FIG. 4 arrangement) in the direction X and relative to the edge of the tool as seen by the first image capture system 110 enables determination of the distance of the tool 312 relative to the optical system 100, and therefore the position in Z of the tool 312. This image also enables identification of the cutting edge or edges (in projection) as seen by the first image capture system 110. This identification is in terms of both position, in particular relative to the edge, and geometry (shape in the image of the line or lines corresponding to the cutting edge or edges).

According to a second possibility concerning said method of detecting the position of the tool (as an alternative to or in addition to the foregoing first possibility), upon activation of the detection unit 304 it is the second image capture system 120 that is used and it is therefore the second image acquisition system 122 that generates one (or more) image(s) of the end portion 313 of the tool 312. The analysis of this image and in particular of the position of the sharply focussed zone of this image (resulting for example from the FIG. 4 arrangement) in the direction X relative to the edge of the tool as seen by the first image capture system 110 enables determination of the distance of the tool 312 relative to the optical system 100, therefore the position in Z of the tool 312. This image also enables determination of the cutting edge or edges (in projection) as seen by the second image capture system 120. This identification is in terms of both position, in particular relative to the edge, and geometry (shape on the image of the line or lines corresponding to the cutting edge or edges).

Also, in one embodiment of the invention there is proposed a method of detecting the profile of a tool 312 mounted on a toolholder 310 in a machining module 300 including a part support 320 and a partholder 310, including the following steps:

i) providing a detection unit 304 in the machining module 300, said detection unit 304 including an optical system 100 for determining the profile of said end portion 313 of the tool 312 mounted on the toolholder 310, with the optical system 100 mounted on the part support 320, ii) loading the tool 312 into the toolholder 310: this step enables identification of the relative position between the tool 312 and the toolholder 310, iii) positioning the toolholder 310 relative to the part support 320 in a measuring operational position (for example in accordance with the FIG. 4 configuration): this step enables placing of the tool 312, and in particular the end portion 313 of the tool 312 or some other portion of the tool 312, in a manner visible to the optical system 100, iv) activating said detection unit 304, and v) determining via the optical system 100 the profile of said end portion 313 (or some other portion) of the tool 312 mounted in the toolholder 310.

According to a first possibility concerning said method of detecting the profile of the tool 312, upon activation of the detection unit 304 it is the first image capture system 110 that is used and it is therefore the first image acquisition system 112 that generates one (or more) image(s) of the end portion 313 of the tool 312. The analysis of this image enables detection of the edge of the tool as seen by the first image capture system 110. This refers to the edge, i.e. the contour, of the end portion 312 of the tool 312, seen in projection in the plane (X, Y) orthogonal to the direction Z, itself parallel to the optical axis O of the optical system. Thus the shape (in this instance the line of the contour) of this edge of the tool 312 provides information on the geometry of the end portion 313 of the tool 312 mounted on the toolholder 310 at the time of imaging.

This image also enables identification of the cutting edge or edges (in projection) as seen by the first image capture system 110. This identification is in terms of both position, in particular relative to the edge, and geometry (shape in the image of the line or lines corresponding to the cutting edge or edges).

According to a second possibility concerning said method of detecting the position of the tool 312 (as an alternative to or in addition to the foregoing first possibility), upon activation of the detection unit 304 it is the second image capture system 120 that is used and it is therefore the second image acquisition system 122 that generates one (or more) image(s) of the end portion 313 of the tool 312. The analysis of this image enables detection of the edge of the tool as seen by the second image capture system 120. It is a question of the edge, namely of the contour, of the end portion 312 of the tool 312 seen in projection in the plane (X, Y) orthogonal to the direction Z, itself parallel to the optical axis O of the optical system. Thus the shape (in this instance the line) of this edge of the tool 312 provides information on the geometry of the end portion 313 of the tool 312 mounted on the toolholder 310 at imaging time. This image also enables identification of the cutting edge or edges (in projection) as seen by the second image capture system 120. This identification is in terms of both position, in particular relative to the edge, and geometry (shape on the image of the line or lines corresponding to the cutting edge or edges).

The use of this kind of method of detecting the profile of the tool 312 in particular determines the angular orientation of the tool 312 relative to the axis X of the toolholder and therefore relative to the part support 312, in the measuring operational position, and also enables verification that the tool 312 is in the required orientation relative to the part support in the measuring operational position. Also, the use of a method of this kind of detecting the profile of the tool 312 makes it possible to establish the profile and to verify that the tool 312 mounted on the toolholder corresponds to the expected tool (the profile detected corresponds to the expected predetermined profile) and therefore makes it possible to prevent mounting an inappropriate tool on the toolholder 310.

Figure 8:
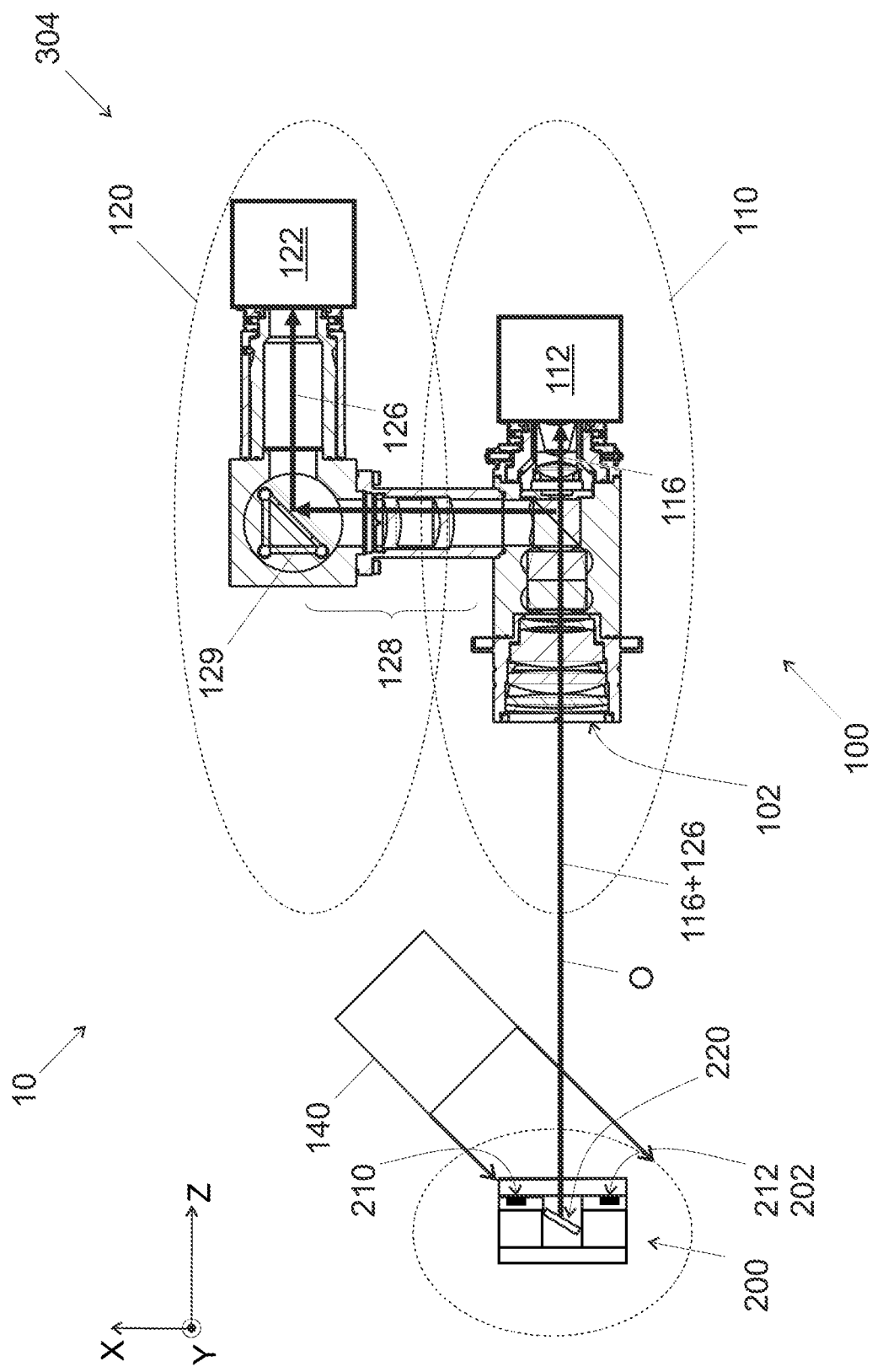
FIG. 8 shows the optical device between the toolholder and the part support in the step of three-dimensional identification thanks to the three-dimensional target.

In FIG. 8 there is represented an optical device 10 including an optical system 100 and a three-dimensional target 200 adapted, in one embodiment, to cooperate with one another to effect the three-dimensional measurement of the relative position between the target 200 and the optical system 100. As will be explained hereinafter, this measurement also enables measurement of the relative position between the toolholder 310 (carrying the target 200) and the part support 320 (carrying the optical system 100), and deduction therefrom of the relative position between the tool 312 (mounted on the toolholder 310) and the part 322 (mounted on the part support 320). In fact, in this measuring position the target 200 is oriented in the direction of the optical system 100, parallel to a main axis, forming a horizontal main direction Z. To this end, at the output of the optical system 100 the optical path O is orthogonal to an active face 202 of the target 200.

The target 200 will now be described with reference to FIGS. 8, 10, 11 and 12. The target 200 takes the form of a tip, here of circular section cylinder shape (it could be of square or other section), one side of which forms the active face 202 for producing the measurement. For producing the measurement this active face 202 is therefore turned toward the optical system 100 and in particular toward the entry face 102 of the optical system 100, the axis Z corresponding to the main direction (horizontal in the figures) separating the active face 202 from the entry face 102 of the optical system 100.

The surface of the active face 202 of the target 200 is divided between a first structure 210 and a second structure 220. The first structure 210 includes a plane reference face 212 the surface of which is smooth and divided between a first portion 214 the surface of which is diffusely reflective and a second portion 216 the surface of which is specularly reflective. More generally, said plane reference face 212 is divided between at least one first portion the surface of which is reflective according to first reflection parameters and a second portion the surface of which is reflective according to second reflection parameters different from the first reflection parameters. In one embodiment the first portion 214 is coated with a diffusely reflective layer, for example a layer of barium sulphate BaSO4, and the second portion 216 is formed of a specularly reflective layer, for example a layer of chromium. In the embodiment shown, the second portion 216 consists of a plurality of localized zones 217 of circular shape forming islets disposed in the first portion 214, which is continuous. More generally, the second portion 216 is divided according to a series of localized zones 217 positioned in the first portion 214. According to one possibility the localized zones 217 of said second portion 216 are formed of distributed islets or segments in the first portion 214. These localized zones 217 may have other shapes, such as segments or islets of other than circular shape. These localized zones 217 define between them a geometrical figure from the following list: quadrilateral, parallelogram, rectangle, square, lozenge, regular polygon and circle. This geometrical figure may be a geometrical figure with central symmetry. In FIGS. 10 and 11 twenty-four circular localized zones 217 are disposed in a square. The object of this first structure 210 is to be able to identify precisely its centre C3 using standard viewing tools. With the square shape, the two diagonals C1 and C2 of this square intersect at the centre of the square. It is to be noted that in the measuring position, as shown in FIGS. 6 to 12, the reference face 212 is disposed parallel to the directions X and Y, respectively forming a vertical direction (axis) and a horizontal direction (axis) that are transverse in the case of the arrangement shown.

The second structure 220 includes a face 222 inclined relative to the reference face 212: this inclined face 222 is essentially plane, the mean plane of this inclined face forming relative to the reference face 212 an acute angle $\alpha$ between 10 degrees and 80 degrees inclusive, for example between 20 and 30 degrees inclusive, and preferably of the order of 25 degrees (see FIG. 12).

In one embodiment the surface of this inclined face 222 is not smooth but features elements 224 in relief forming surface irregularities that are either random or in accordance with a predetermined geometry, for example forming between them a grid or an array of lines, thus constituting a structured grid (not represented) or a structured array of lines (see FIG. 13). Also, in one embodiment, the surface of the inclined face 222 of the second structure 220 is striated, and in particular the surface of the inclined face 222 of the second structure 220 is covered by one of the following elements: etched array, structured grid or array of specular lines 225.

Elements 224 in relief of this kind may be protrusions or hollows, i.e. set back relative to the mean plane of the inclined face 222, in particular in the form of small roughnesses or any other surface irregularity. Elements 224 in relief of this kind may be present over all the surface of the inclined face 222. Elements 224 in relief of this kind may be regularly distributed over all the surface of the inclined face 222. For example, these elements 224 in relief may form a set delimiting a grid or array pattern or more generally a structured surface or a rough surface that enables good diffusion of light reflected at this inclined face 222. The surface of the inclined face 222 of the second structure 222 is for example covered by one of the following elements: etched array or structured grid, with a pitch between the patterns of the grid or of the array between 5 and 100 micrometres inclusive, in particular between 5 and 50 micrometres inclusive, and in particular between 8 and 15 micrometres inclusive, for example of the order of 10 micrometres.

For example, this inclined face 222 is of unpolished silicon or ceramic, unpolished metal or glass or any other material that can be structured, and the elements 224 in relief have been obtained by photolithography, machining by removal of chippings, direct writing, etc. . . . or any other structuring process. These elements 224 in relief form for example depressions and/or projections respectively set back from/projecting from the mean plane by a few micrometres or a few tens of micrometres, in particular between 0.5 micrometre and 50 micrometres.

In another embodiment, as shown in FIG. 14, the surface of this inclined face 222 is smooth and includes an array of lines of chromium or of some other material causing specular reflection from these lines of chrome that constitute specular elements 225. These specular elements 225 in the form of lines are disposed parallel to one another. In the measuring position these specular elements 225 in the form of lines or bands are disposed parallel to the plane Y, Z so that these lines are encountered one by one along the inclined surface in the direction Z (this is also the case when advancing in the direction X). The substrate forming the small plate of the second structure 220 can then be made of different materials, including glass or silicon, with on the inclined face 222 a diffusely reflective layer, for example a layer of barium sulphate $BaSO_4$ that alternates with the specular elements 225 or covers all the surface of the inclined face, with the specular elements 225 disposed on top of this diffusely reflective layer. Specular elements 225 of this kind may be regularly distributed over all the surface of the inclined face 222. In one embodiment these specular elements 225 in the form of lines form an array with a pitch of 25 micrometres, the lines (in particular of chromium) having a width of 12.5 micrometres, equal to the width of the gap between lines or a diffusely reflective portion also taking the form of lines or of bands 12.5 micrometres wide. In accordance with another embodiment, a pitch of 10 micrometres or more generally a pitch between 5 and 50 micrometres is used. It must be noted that these specular elements 225 that alternate with the rest of the surface that produces a diffuse reflection could take forms other than continuous lines or segments forming bands, in particular discontinuous or dashed lines, patterns such as strips, circles, triangles, or any other geometrical shape.

According to an embodiment that is not shown, the inclined face 222 of the second structure 220 carries localized and projecting elements 224 in relief in the form of small mounds or spikes, which are distributed in rows parallel to one another, the elements 224 in relief being offset from one another from one row to another to form a quincunx pattern. According to another embodiment that is not shown the inclined face 222 of the second structure 220 bears projecting elements 224 in relief in the form of segments parallel to one another at equal distances in two series crossing over at 90° to one another. This set of elements 224 in relief constitutes a grid pattern. Note that this grid may be formed of two series of segments parallel to one another with series of segments crossing at an angle other than 90° to one another. In FIGS. 10 to 13 the inclined face 222 of the second structure 220 bears recessed elements 224 in relief in the form of a series of segments parallel to one another and at equal distances from one another in the direction X: in this case these elements 224 in relief form grooves. This direction X is therefore orthogonal to the direction of the segments forming the elements 224 in relief.

In the embodiment from FIG. 14 the surface of the inclined face 222 of the second structure 220 is therefore covered by an array of specular lines 225, namely continuous bands parallel to one another the surface of which has specular reflection properties.

Accordingly, in some of the aforementioned cases, and in particular those from FIGS. 13 and 14, the surface of the inclined face 222 of the second structure 220 is striated.

According to the embodiments represented for the target 200 the tip delimiting the target 200 includes on its active face 202 the first structure 210, which occupies most of the surface of the active face 202, and in the first structure 210 an area reserved for the second structure 220. In this situation the first structure 210 surrounds the second structure 220. To be more precise, the localized areas 217 of the second portion 216 of the first structure 210 define a square that surrounds the second structure 220. In one possible disposition, and in the case of the embodiments of the target 200 as shown, the first structure 210 and the second structure 220 are disposed concentrically with one another on the active face 202. Moreover, as in the situations represented, the first structure 210 delimits an opening 218 for a housing 219 accommodating said second structure 220 that is for example disposed on a small plate including the inclined face 222. When the small plate is accommodated in the housing 219 of the first structure 210 its inclined face 222 faces in the direction of the outside of the housing 219, toward the opening 218. In this instance the second structure 220 is disposed in said housing 219 with the inclined face 222 set back relative to the reference face of said first structure 210: this means that the inclined face 22, and therefore the second structure 220, are disposed at the rear, behind the plane delimited by the reference face 212 (relative to the main direction Z, see FIG. 11), in the housing 219 for example by 0.05 to 2 millimetres or of the order of 0.15 millimetre. According to another possibility, not represented, the second structure 220 is disposed at the front, in front of the plane delimited by the reference face 212. According to a further possibility that is not represented the second structure 220 is disposed on either side of the plane delimited by the reference face 212, i.e. one part of the inclined face 222 is disposed at the rear and the other part of the inclined face 222 is disposed at the front relative to the reference face 212.

In order to protect the first structure 210 and the second structure 220 from the environment (dust, oil, impact, . . . ), as can be seen in FIG. 12 the target 200 includes a protective plate 230 made of a transparent material, in particular of glass, covering the first structure 210 and the second structure 220 on the side of the active face 202. According to one possible embodiment represented in FIG. 12 the target 200 includes the following elements in the form of a stack. A bottom wall 231 is surmounted by a plate 232 formed of a plate open at its centre in order to delimit the housing 219 delimited by the opening 218 on the side of the active face 202. The plate 232 is surmounted by the protective plate 230 closing the housing 219. Everything is surrounded by a cylindrical wall 234 retaining the whole of the target 200. The protective plate 230 that includes the second structure 220 is for example a plate of silicon accommodated in the housing 219 with the inclined face 222 (bearing the elements 224 in relief or the specular elements 225) facing toward the active face 202. The face of the plate 232 facing toward the active face 202 includes a reflective layer 233 in two areas as described above and respectively in relation to the first portion 214 (diffusely reflective surface) and the second portion 216 (specularly reflective surface, in particular in the form of localized elements 217).

Figure 5:
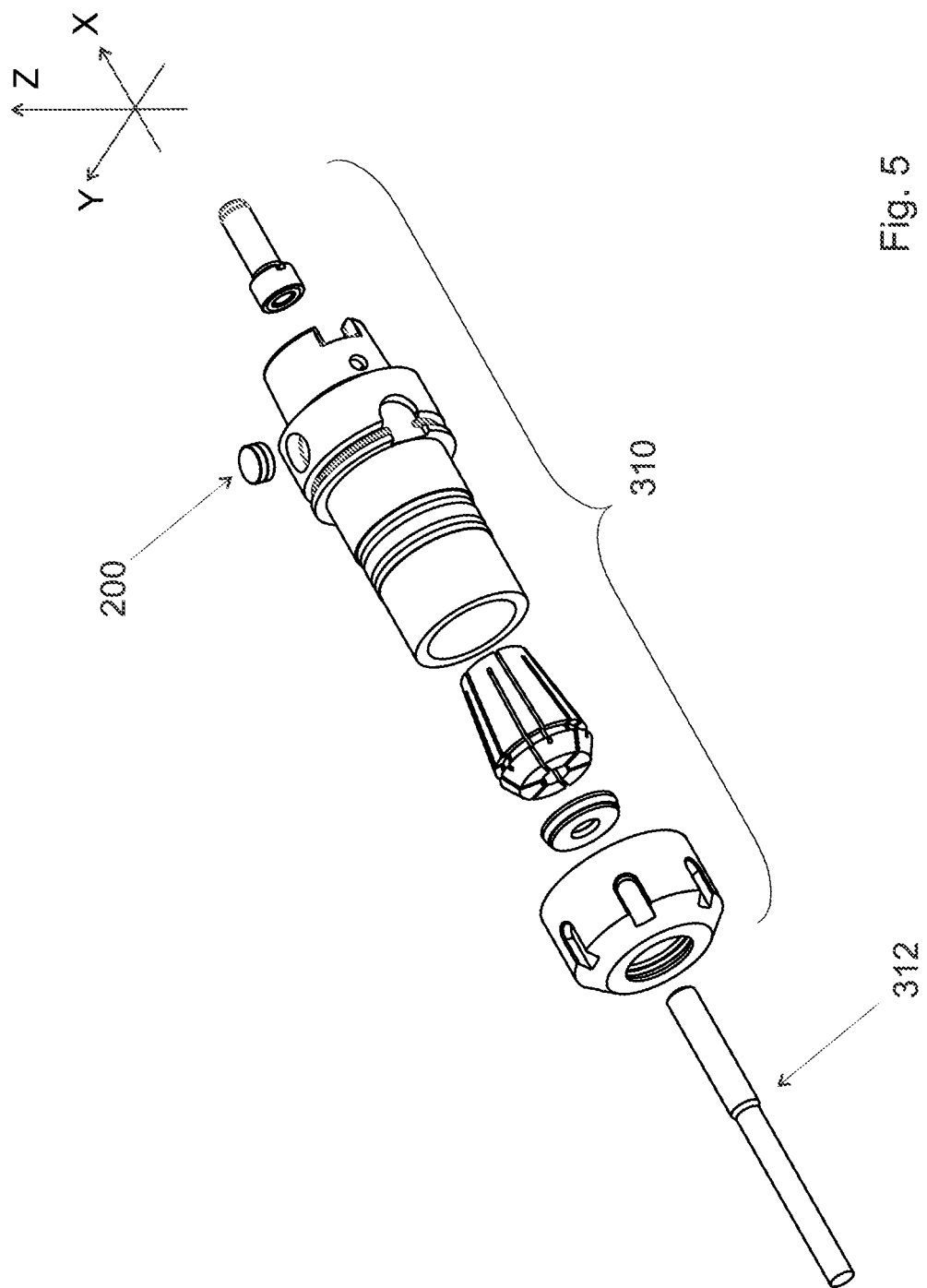
FIG. 5 is an exploded perspective view of a toolholder equipped with a three-dimensional target.
Figure 9:
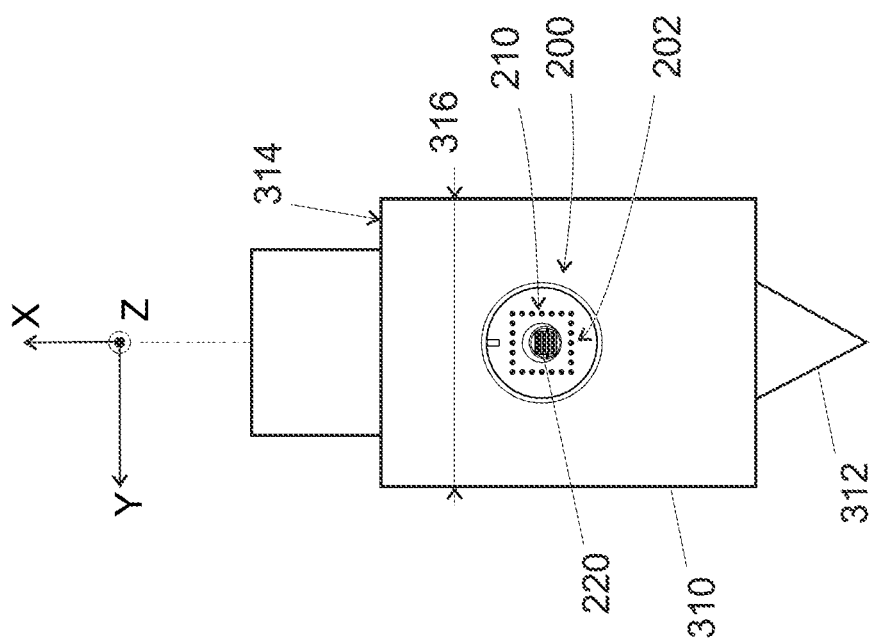
FIG. 9 shows the part of FIG. 6 corresponding to the toolholder with the three-dimensional target, as seen in the direction IX in FIG. 6, that is to say in the direction Z, as the optical system is seen when the target is oriented in the direction of the optical system.

Moreover, the target 200 may be equipped with an RFID (radio-frequency identification) type microchip that is not represented in order to enable the storage and reading of a unique identifier and data in relation to the target 200 and possibly also in relation to a toolholder 310 (see FIGS. 1 and 5) on which the target 200 is intended to be mounted. This data may include for example and in particular the reference of that toolholder 310 and other information linked to the use of that toolholder 310 (for example its serial number, its type, its adjustment relative to the material centre or part support 320, the number of times that it has been used, . . . ). In FIGS. 5, 9 and 16 the target 200 (and where applicable the RFID microchip) is mounted on the portion of the toolholder 310 forming a clamp.

Reference will now be made to FIG. 8 to describe the optical system 100 associated with the target 200 that has just been described to form together an optical device 10 enabling measurement of the relative position between two objects in the three directions in space and thus the relative position between the part support 320 and the toolholder 310 or the relative position between the part 322 to be machined and the tool 312. In particular there is considered an orthogonal (possibly orthonormal) space in a Cartesian system of axes X, Y and Z that is a direct system of axes in the figures). This optical system 100 is intended to produce simultaneously during the same imaging sequence both an image of the first structure 210 of the target 200 and at the same time an image of the second structure 220 of the target 200. According to the present text, this simultaneous capture of two images is effected without focusing, which enables very rapid execution of this imaging. Other characteristics, linked in particular to the specific structure of the target 200 that has just been described, moreover enable maximum precision. The applicant company has produced a three-dimensional measuring optical device 10 conforming to the present description able to produce in a half-second or less a repeatable relative measurement with a precision of one micrometre or less.

The optical system 100 comprises the first image capture system 110 and the second image capture system 120. According to one possible disposition said optical system 100 is arranged so that the difference between the focal distance of the second image capture system 120 and the focal distance of the first image capture system 110 is between the minimum distance and the maximum distance inclusive separating the reference face 212 from the inclined face 202. According to another possible arrangement the depth of field DFO1 of the first image capture system 110 is much greater than and in particular at least ten times greater than the depth of field DFO2 of the second image capture system 120. For example the depth of field DFO1 of the first image capture system 110 is between 10 and 10 000 or between 100 and 5000 times greater than the depth of field DFO2 of the second image capture system 120. Among various possibilities, the depth of field DFO1 of the first image capture system 110 is greater than or equal to 0.8 millimetre, or between 0.5 and 5 millimetres inclusive, or between 0.8 and 3 millimetres inclusive, or between 1 and 2 millimetres inclusive. Also, according to various possibilities, the depth of field DFO2 of the second image capture system 120 is less than or equal to 0.1 millimetre, or between 5 and 50 micrometres inclusive, or between 8 and 30 micrometres inclusive, or between 10 and 20 micrometres inclusive.

In accordance with one embodiment the first image capture system 110 is configured so that its image focal plane F1 is able to correspond to the reference face 212 of the first structure 210 and the second image capture system 120 is configured so that its image focal plane F2 is able to intersect the inclined face 222 of the three-dimensional target 200.

When the object viewed by the optical system 100 is the target 200, the first image capture system 110 is inherently able with no other adjustment to focus on all the reference face 212 of the first structure 210 over a range of distances between the target 200 and the first image capture system 110 that is able to vary over a few millimetres. In parallel with this, the second image capture system 120 is inherently able with no other adjustment to be focused on the portion of the inclined face 222 of the second structure 210 that is at the distance from the second image capture system 120 corresponding to the focal distance of the second image capture system 120. According to one possibility, the magnification of the first image capture system 110 is less than the magnification of the second image capture system 120.

In one possible configuration the optical system 100 is arranged so that the optical path of the first image capture system 110 and the optical path of the second image capture system 120 have a common section placed on the optical axis O of the optical system 100 and including the image focal plane F1 of the first image capture system 110 and the image focal plane F2 of the second image capture system 120. In this case the optical system 100 is preferably arranged so that the optical path from the object passes through at least a portion of one of the first and second image capture systems 120 before reaching the other of the first and second image capture systems 120.

According to one possible disposition the first image acquisition system 112 of the first image capture system 110 and the second image acquisition system 122 of the second image capture system 120 are synchronized in order simultaneously to capture a first image via the first image capture system 110 and a second image via the second image capture system 120. In this case it is clear that the target and the optical system 100 are parts of a measuring optical device 10 that is configured to enable, via a single step of imaging of the target 200 by the optical system 100, to determine the three-dimensional relative position between the support 320 of the part to be machined and the toolholder 310. In this case this single step of imaging the end portion 313 of the tool mounted on the toolholder 310 by the optical system 100 enables determination of the profile of the end portion 312 of the tool 312 mounted on the toolholder 310 and in particular the three-dimensional profile of the end portion 312 of the tool 312 mounted on the toolholder 310.

As already described above, to enable simultaneous access to the view of the target 200 by the first image capture system 110 and by the second image capture system 220 the latter have a common optical path portion that is directed toward and comes from the object viewed by the optical system 100, in this instance the target 200 (see FIGS. 6 and 8) after mounting the target 200 on the toolholder 310 and mounting the optical system 100 on the part support 320. To this end, in the measuring operational position, the first image capture system 110 faces in the direction of the active face 202 of the target 200 and forms an image capture system aligned with the target 200 and the second image capture system 120 has an optical path 126 that joins the optical path 116 of the image capture system 110 aligned with the target 200 and forms an image capture system that is eccentric relative to the target 200, relative to the optical axis O of the optical system 100, and relative to the common portion of the optical paths 116 and 126 (the common portion aligned with the target). In other words, the optical path of the image capture system aligned with the target 200 is substantially perpendicular to the reference face 212.

Figure 6:
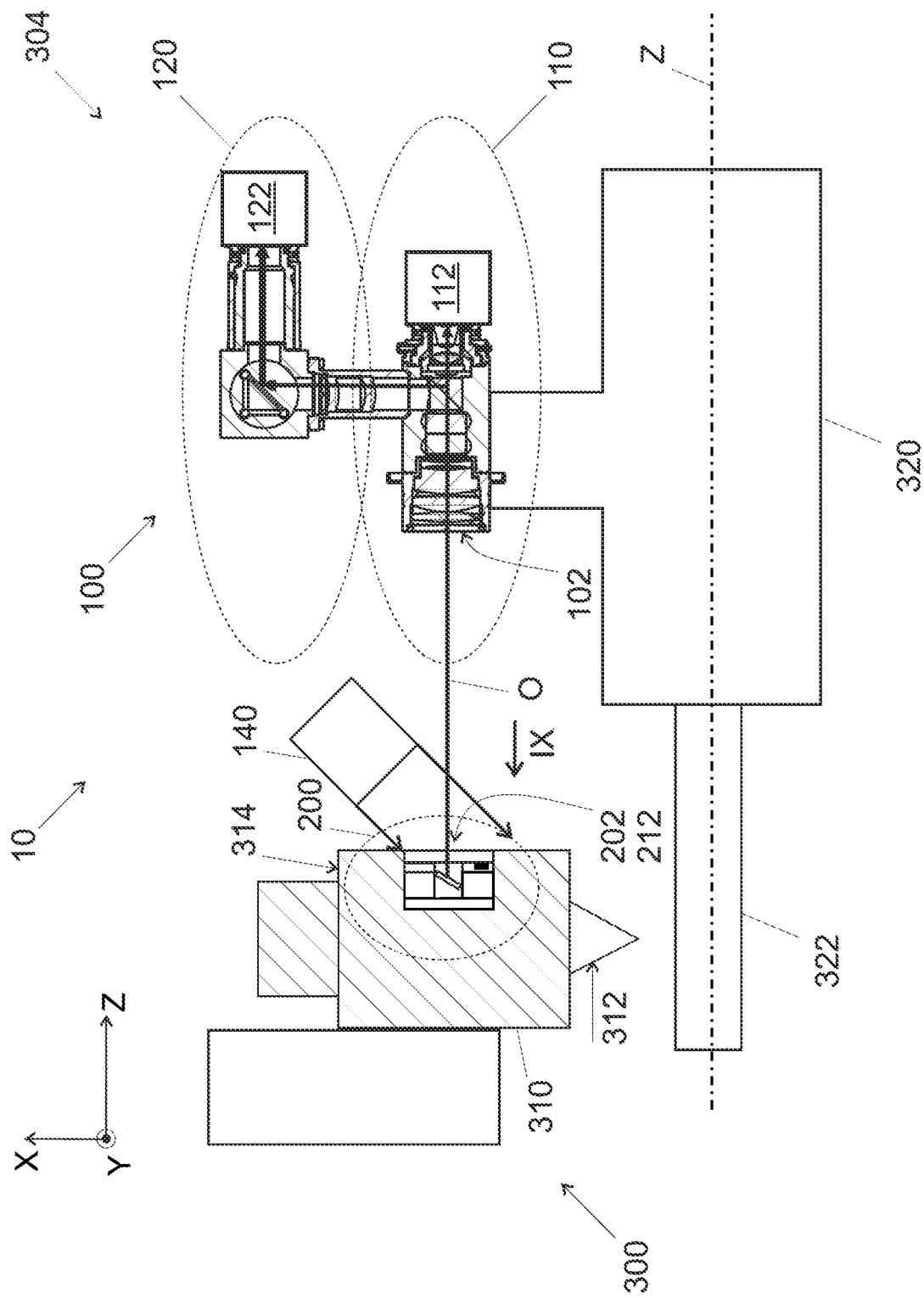
FIG. 6 shows the use of the optical device of the machining module to determine the measurement in space of the relative position between the toolholder and the part support (also called the material spindle)

In particular, as shown in FIGS. 6 and 8, the first image capture system 110 faces in the direction of the active face 202 of the target 200, that is to say the first image capture system 110 is oriented in a perpendicular manner relative to the active face 202 of the target 200. This means that the optical axis O and the common portion of the optical paths 116 and 126 are aligned with the target 200 and are perpendicular to the active face 202 (and therefore to the reference face 212) of the target 200. In this configuration, as seen in FIGS. 6 and 8, the optical axis O and the common portion of the optical paths 116 and 126 are parallel to the main direction Z and are orthogonal to the transverse directions X and Y and to the plane X, Y.

In one embodiment the focal distance of the second image capture system 120 is greater than the focal distance of the first image capture system 110. For example, the difference between the focal distance of the second image capture system 120 and the focal distance of the first image capture system 110 is between 0.5 and 5 millimetres inclusive.

In one embodiment the magnification of the first image capture system 110 is less than or equal to the magnification of the second image capture system 120. For example, the magnification of the first image capture system 110 is between 0.2 and 1 times inclusive the magnification of the second image capture system 120. For example, the magnification of the first image capture system 110 is between 0.3 and 0.8 inclusive, or between 0.4 and 0.6 inclusive, and preferably around 0.5 times the magnification of the second image capture system 120.

In the embodiment from FIGS. 6 and 8 the optical system 100 further includes the light source 140 referred to above in relation to FIGS. 1 to 4 oriented in the direction of the toolholder 310 and adapted to be oriented in the direction of the three-dimensional target 200, this light source 140 being disposed so as to be able to provide lateral illumination of the three-dimensional target 200. To this end this light source 140 is arranged in an eccentric and inclined manner relative to the optical path 116+126 of the optical system 100. In particular, the light rays from the light source 140 form with the reference face 212 of the target an angle such that their specular reflection at the reflective surfaces of the target, and in particular in the localized zones 217, generates reflected light rays that do not penetrate into the optical system 100. Similarly, when the inclined face 222 includes specular elements 225, the reflection of the light rays from the light source 140 at these specular elements 225 do not penetrate into the optical system 100.

In accordance with one embodiment the first image capture system 110 used and the second image capture system 120 used are telecentric. Telecentricity is a characteristic of an optical system wherein all the principal rays (the central ray of each beam consisting of rays) that pass through the system are practically collimated and parallel to the optical axis. In the case of telecentric optics the depth of field concept is replaced by that of working distance. In accordance with another embodiment the first image capture system 210 used and the second image capture system 220 used are not or are not both telecentric. In the situation where they are both telecentric they may also be used to measure the geometrical characteristics of the tools disposed on the toolholder 310 as already described above or later in the present text.

In one embodiment the machining module 300 includes the target 200 described above mounted on the toolholder 310 (see FIG. 1). This target 200 includes the active face 202 that forms a positioning reference able to be placed on the optical axis O of the optical system 100 when the toolholder is in a predetermined angular position around its axis X (after rotation as indicated by the arrow R in FIG. 1) and in a predetermined axial position along its axis X (see FIGS. 6, 7 and 8), forming a reference position of the toolholder 310 relative to the part support 320. In this reference position the target 200 is disposed so that the image focal plane of the optical system 100 is able to coincide with the active face 202 of the target. In particular, but not in a limiting manner, in this reference position the target 200 is disposed so that the image focal plane F1 of the first image capture system 110 of the optical system 100 may coincide with the active face 202 of the target (see FIG. 12) and so that the image focal plane F2 of the second image capture system is able to intersect the inclined face 222 of the target 200 (the focal distance of the second image capture system 120 is able to place the image focus F2 of the second image capture system 120 on the second structure 220 of the target 200).

Reference is now made to FIGS. 1 and 6 to describe the three-dimensional optical measuring method between the target 200 and the optical system 100 in the case of a machine tool wherein the machining module 300 includes an optical device 10. Taken as the reference directions X, Y and Z are those of the machine tool, in particular of the frame of the machine tool, which yields a vertical direction X (or first transverse axis), a main horizontal direction Z (or main axis) and a lateral horizontal direction Y (or second transverse axis). The target 200 is placed on the toolholder 310 (see FIG. 5): the toolholder 310 extends in a horizontal main direction corresponding to the axis X with the possibility of turning about that axis X. To this end a part of the toolholder 310, for example the clamp, bears housings on its periphery usually dedicated to mounting the tool for clamping/unclamping the clamp wherein the target 200 may be placed, possibly associated with an RFID microchip as described above. Moreover, the optical system 100 is mounted on the part support 320 (see FIG. 1) receiving the part 322 to be machined. The part support 320 extends in its horizontal main direction, corresponding to the axis Z, with the possibility of turning about that axis Z. Subsequently, the part support 320 and the toolholder 310 are placed in a close together position prior to a machining step, placing the tool 312 and the part 322 to be machined close to one another in a relative measuring position. Positioning the target 200 on the toolholder 310 and positioning the optical system 100 on the part support 320 enable, in this relative measuring position, placing of the target 200, to be more precise the reference face 202, in line with the optical axis O of the optical system 100 (note that this optical axis O is parallel to the direction Z). The reference face 202 of the target 200 therefore faces in the direction of the entry face 102 of the optical system 100.

As in the situation represented in FIG. 1, the optical device 10 further includes a third image capture system 130 disposed on the toolholder 310 and configured to identify the orientation of the active face 202 of the target 200 and/or the angular orientation of the rotary part of the toolholder 310, in particular about the axis X. An additional preliminary step of positioning the target 200 is effected before the step of image capture simultaneous with said optical system 100, wherein:

the toolholder 310 and the part support 320 are placed so that the active face 202 of the three-dimensional target 200 is on the optical path O of the optical system 100. In particular, the third image capture system 130 may be used to identify the angular orientation of the target 200 relative to the rotary part of the toolholder 310, and therefore relative to the axis X, which if necessary makes it possible to modify the angular orientation of the rotary part of the toolholder 310 (see the arrow R in FIG. 6), and thus to place the target 200 so that its active face 202 faces in the direction of the optical system 100. There is obtained the relative measuring position wherein when the target 200 is oriented in the direction of the optical system 100 as described above in the case of FIGS. 6 and 8: in this case, the direction Z extends between the target 200 and the optical system 100.

In one embodiment the optical device 10 further includes a third image capture system 130 disposed on the toolholder 310 and configured to identify the angular orientation of the toolholder 310 about its axis X. With a target 200 present, this third image capture system 130 also or only enables identification of the orientation of the active face 202 of the target 200 about the axis X of the toolholder 310.

Upon the first use of the optical device 10, namely of the optical system 100 and of an associated target 200, respectively mounted on a part support 320 and on a toolholder, an additional preliminary step must be carried out of spatial referencing in the three directions X, Y and Z of the position of the target 200 relative to the toolholder 310 that carries the target 200. It must be noted that the parameters of the optical system 100, namely of the first image capture system 110 and of the second image capture system, including their focal distance, are obviously known. At this stage, it may be pointed out that if the working space of the machining module 300 is confined and maintained at a constant temperature, this thermal stability generates dimensional stability of the optical device 10 and therefore of its parameters.

It must be remembered that in the end the measurement of the three-dimensional relative position between the target 200 and the optical system 100 is used in the case of a machine tool to determine the three-dimensional relative position in X, Y and Z between the toolholder 310 and the part support 320.

In the present text the three direction X, Y and Z are for example the axes of the machining module 300 of the machine tool. Thus Z may be defined as being the main axis, namely the main horizontal direction separating the first object (the toolholder 310) from the second object (the part support 320). X may be defined as the vertical direction or more generally a first transverse axis and Y may be defined as a lateral horizontal direction or more generally a second transverse axis. In one embodiment the toolholder 310 turns about an axis parallel to this direction X.

During this step of spatial referencing in the three directions X, Y and Z of the position of the target 200 (calibration of the optical device 10), for example with the arrangement from FIGS. 6 and 9, image capture by the optical system 100 is activated, which generates on the one hand the generation by the first image acquisition system 112 of the first image capture system 110 of a first sharply focused image of all of the active face 202 of the target 200 with all the reference face 212 and on the other hand the generation by the second image acquisition system 122 of the second image capture system 120 of a second image of all of the inclined face 222 of the target 200 with only one sharply focused zone in the form of a horizontal band. This first image includes the image of the localized areas 217, here delimiting a square (see FIG. 10), so that processing the first image generates the diagonals C1 and C2 of the square and enables identification of the centre C3 of the square. Accordingly, as the position of the optical axis O on the first image is known, the determination of the position of the centre C3 of the square enables the position in X and in Y of the target 200 relative to the optical axis O to be determined, but also on the one hand relative to a marker 314 in direction X on the toolholder 310 and on the other hand relative to a marker 316 in direction Y on the toolholder 310. In fact, as seen in FIGS. 6 and 9, there is used by way of an X reference a face of the toolholder 310 that is orthogonal to the axis X, for example resulting from a re-entrant shoulder along a section of the toolholder 310, visible as a line in the first image, and forms said marker 314 in direction X (see FIG. 9). Moreover, as seen in FIGS. 6 and 9, there is used as a Y reference a dimension of the toolholder 310 in the vicinity of the target 200, which is orthogonal to the axis X, and which in the situation represented is the width (parallel to the direction Y) of the toolholder 310 near the target 200, for example the diameter when this portion of the toolholder 310 is a cylinder of circular section; this dimension forms said marker 316 in direction Y (see FIG. 9).

Figure 15B:
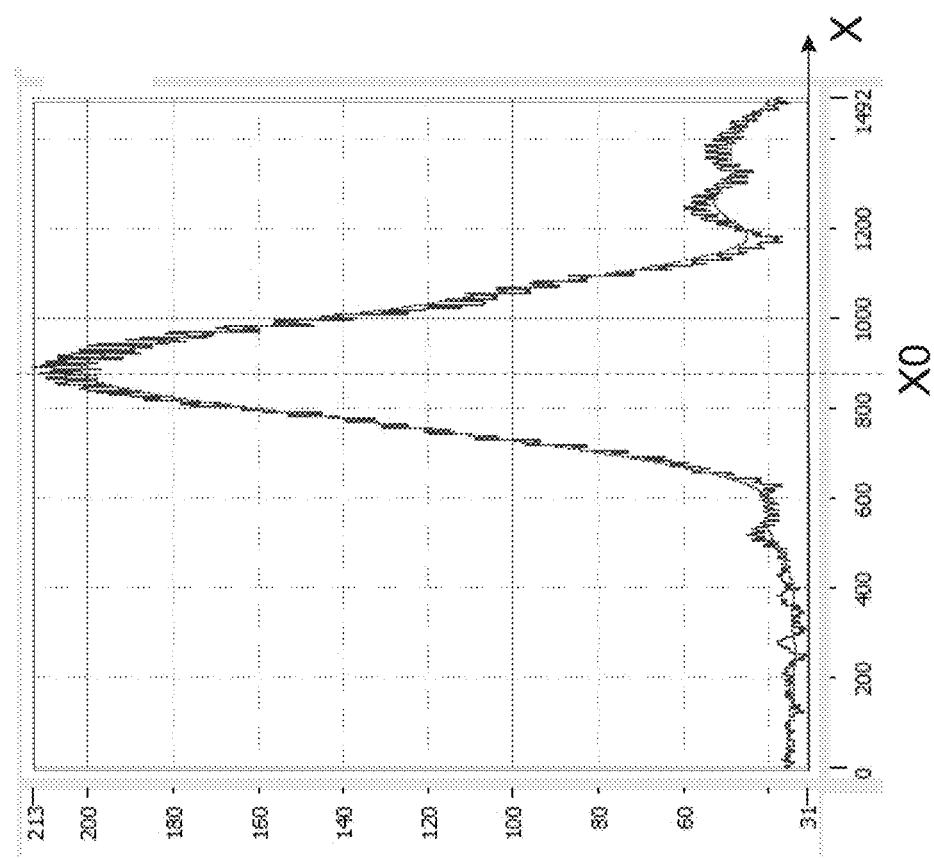
FIGS. 15A and 15B show the processing of the image generated by the second image capture system of the optical system.
Figure 15A:
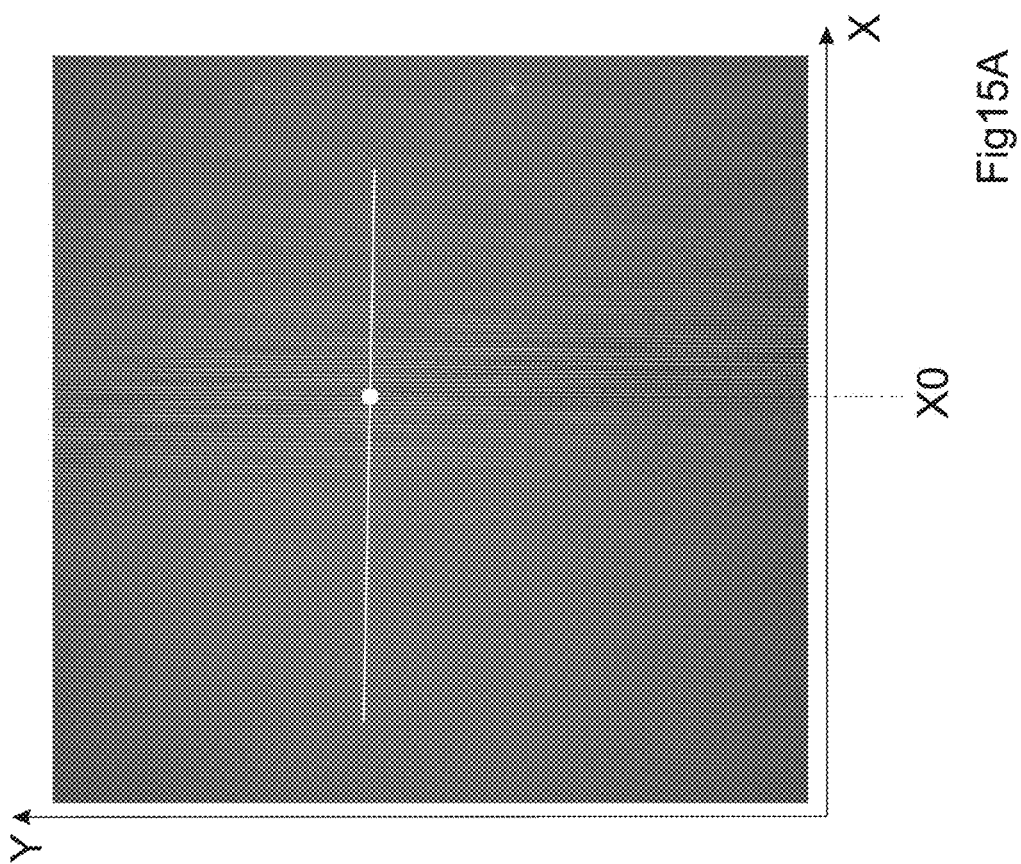

In parallel with this the second image, an example of which can be seen in FIG. 15A, is processed. By analysing the local contrast of this second image (see FIG. 15B representing curves of contrast as a function of the position in X), there is determined the position X0 in the vertical direction X of the sharply focused zone of the second image. This analysis employs an algorithm for determining the most sharply focused pixels of the image. As the inclination of the inclined face 222 is known, there is available a curve of correspondence between X and Z of this inclined face 222 specific to the target 200. Thanks to this curve of correspondence the known position X0 (see FIGS. 15A and 15B) enables deduction therefrom of the position Z0 of the inclined face 222 on the optical axis O and therefore the position in Z of the target 200 relative to the optical system 100. Moreover, the relative position in Z of the optical system 100 relative to the part support 320 is known from a measurement scale (not represented) disposed on the axis Z on the part support 320 and that supports the optical system 100. Similarly, the position in Z of the target 200 relative to the marker 314 of the toolholder 310 is known.

By effecting this operation multiple times and each time modifying the distance in Z of the part support 320 relative to the toolholder 310 (for example by moving the part support 310 backward or forward), it is therefore possible to reconstitute the three-dimensional image of the inclined face 222 of the target 200 and to obtain a reference base forming a map of the three-dimensional coordinates of the inclined face 222 of the target 200 relative to the toolholder 310. In the end, it is all the active face 202 of the target 200 (reference face 212 and inclined face 222) that is referenced spatially in the three directions X, Y and Z relative to the toolholder 310.

Subsequently, the measurement proper may be effected each time that it is necessary during operations of using the machining module 300 equipped with this target 200 and with this optical system 100, which are not demounted in the meantime in order to preserve the precision of the measurement of the spatial referencing described above. To this end, the arrangement from FIG. 6 is used. If necessary, the part support 320 is rotated about its rotation axis, which is parallel to the axis X (see the arrow R in FIG. 1), to align the target 200 with the optical system 100. Image capture by the optical system 100 is then activated, which causes on the one hand the generation by the first image acquisition system 112 of the first image capture system 110 of a first sharply focused image of all the active face 202 of the target 200 with all the reference face 212 and on the other hand the generation by the second image acquisition system 122 of the second image capture system 120 of a second image of all the inclined face 222 of the target 200 with only one sharply focused zone in the form of a horizontal band corresponding to the focal distance of the second image capture system 120. As described above, the analysis of this first image enables identification of the centre C3 of the square formed by the localized elements 217 and thus the position in X and in Y of the target 200 relative to the optical axis O and also relative to the toolholder 310. The analysis of the second image and in particular of the position of the sharply focused zone of the second image (as in FIG. 6) in the direction X enables determination of the position in Z, and therefore the distance, of the target 200 relative to the optical system 100. In fact, for the second image, as the position in Z is known of each pixel of the image of the inclined face 222 relative to the references 314 and 316 on the toolholder 310, it is possible very rapidly to measure the position Z of the target 200 and therefore of the toolholder 310.

It is clear from the foregoing description that in this way there is measured very rapidly, exclusively by the analysis of the two images generated by the optical system 100 and without the loss of time that adjustment or focusing of the optical system 100 would necessitate, the position in X, Y and Z of the target 200 relative to the optical system 100 and thus of the toolholder 310 relative to the part support 320. This is possible because the position in X, Y and Z of the optical system 100 relative to the part support 320 that supports it is known. This referencing of the material centre (part support 320) relative to the toolholder 310 may be effected for example by mounting a feeler on the toolholder 310 which, in a first step of referencing in the direction X, comes into contact with the tip of the feeler on the optical system 100 on the one hand and on the material support 320 on the other hand, which gives the distance in the direction X between the optical system 100 and the optical system 100. By effecting these feeler contact steps again after placing the axis of the toolholder 310 parallel to the axis Z of the part support it is possible to obtain the distance in the direction Z between the optical system 100 and the optical system 100.

In the event of thermal drift, for example expansion of the various parts of the machining module, this measurement procedure enables the effect of the thermal expansion to be circumvented.

This procedure may be used for the determination of the position or the profile of the end portion 313 of the tool 312 mounted on the toolholder 310 by the optical system 100 as described hereinafter. The process is in accordance with the foregoing explanations in relation to the spatial referencing of the position in the three directions X, Y and Z of the target 200 relative to the optical system 100 with the difference of no longer placing the target 200 but instead the end portion 313 of the tool 312 on the optical axis O of the optical system (see FIGS. 4 and 16). In this case it is clear that upon activation of the detection unit 304 the first image capture system 110 and the second image capture system 120 are both used (in particular in a simultaneous manner) and it is therefore the first image acquisition system 112 and the second image acquisition system 122 that generate one (or more) image(s) of the end portion 313 of the tool 312. In fact, in this measuring position, the end portion 313 is disposed so that the image focal plane F1 of the first image capture system 110 of the optical system 100 can coincide with a portion of the surface of the end portion 313 and so that the image focal plane F2 of the second image capture system can intersect a portion of the surface of the end portion 313: the focal distance of the second image capture system 120 therefore enables the image focus F2 of the second image capture system 120 to be placed on a portion of the surface of the end portion 313.

It is therefore clear that the image captured by the second image capture system 120 enables via the sharply focused zone precise information to be obtained as to the distance along the axis Z of the position of the end portion 313 of the tool 312 relative to the optical system 100 (and therefore of the part support 320) and the image captured by the first image capture system 110 is an image of all the visible face of the end portion 313 of the tool 212 with all or a large portion of that image being sharply focused. This image of the end portion 313 captured by the first image capture system 110 enables a map to be provided of that end portion 313 of the tool 212, including a view of the line of the edge of this end portion 313 of the tool 212 seen in projection along the axis Z and forming the profile or a part of the profile of that end portion 313.

In accordance with a third possibility concerning the method of detecting the profile of the tool 312, as described above, during activation of the detection unit 304 it is therefore (at least and in some cases only) the first image capture system 110 that is used and it is therefore the first image acquisition system 112 that generates one (or more) image(s) of the end portion 313 of the tool 312. The analysis of that image enables detection of the edge of the tool as seen by the first image capture system 110. This is the edge, i.e. the contour, of the end portion 312 of the tool 312 seen in projection in the plane (X, Y) orthogonal to the direction Z, itself parallel to the optical axis O of the optical system. Thus the shape (in this instance the line) of this edge of the tool 312 as determined from the image captured by the first image capture system 110 provides information as to the geometry of the end portion 313 of the tool 312 mounted on the toolholder 310 at the moment of capturing the image. This image also enables identification of the cutting edge or edges (in projection) as seen by the first image capture system 110. This identification is in terms of both position, in particular relative to the edge, and geometry (shape in the image of the line corresponding to the cutting edge).

It is clear that these operations of imaging the end portion 313 of the tool may be iterated several times after rotation about the axis X of the toolholder 310, in particular rotation by a few degrees or 10 to 20°, to capture different images of the end portion 313 from the optical system 100, as seen from different angles. All these images enable three-dimensional reconstruction of the shape (the profile) of the end portion 313 of the tool 312.

In one embodiment of the invention there is also proposed a method of detecting wear of a tool 312 in a machine tool wherein the method of detecting the profile of the tool as described above is employed (in accordance with one or the other of the possible embodiments described above), which generates information (including at least one image) representing the profile of the end portion 313 of the tool in a first state and which further includes the following steps:

vi) carrying out machining steps using said tool 312, by which is obtained a tool 312 with an end portion 313 of the tool having a modified profile (second state or new profile), and vii) positioning the toolholder 310 relative to the part support 310 in said measuring operational position (for example in accordance with the FIG. 4 configuration), viii) activating said detection unit 304, and ix) determining via the optical system 100 the modified profile of said end portion 313 of the tool 312 mounted in the toolholder 310 (for example to verify the position and/or the orientation of the cutting profile or for example to verify the nature of the cutting tool and therefore that this is the category of cutting tool required for the future machining operation), and x) establishing a state of wear of the tool from the profile and the modified profile of said end portion 313 of the tool.

In this case comparing information linked to the image (or images) of the end portion 313 of the tool in its first state and in its second state therefore makes it possible to determine, to track and to qualify the wear of the tool, including the degree of wear, the type of wear, the rate of wear, . . . . This procedure for example enables construction of a wear curve as and when images are captured in parallel with the use of the tool, in particular for a first tool from a series of identical tools. For each new tool from that series of identical tools the wear curve can be produced again from information linked to the images captured or the wear curve already established to be adapted to form a wear chart for that type of tool. In this way, upon use of the nth tool from that series of identical tools images may be captured less frequently and in any event by comparison with the wear curves or the wear chart previously obtained, to see a trend and therefore to anticipate the future wear of that tool, which makes it possible on the one hand to modify accordingly the adjustments of the machine tool for the new parts produced using that tool or for new machining passes yet to be effected on the current part and on the other hand to anticipate/decide on changing the tool or not for the next part.

This also serves to qualify the good (bad) state of the tool by verifying and validating (or invalidating) that after the machining steps carried out the tool having the modified profile has a new geometry that still corresponds to that required by the specifications.

Moreover, the use of this kind of method for detecting wear of the tool 312 also and in particular enables determination of the angular orientation of the tool 312 with its modified profile relative to the axis X of the toolholder and therefore relative to the part support 312 in the measuring operational position and also enables verification that the tool 312 with its modified profile is in the required orientation relative to the part support 310 in the measuring operational position. The use of this kind of method of detecting the wear of the tool 312 also makes it possible to establish the profile and to verify that the tool 312 mounted on the toolholder corresponds to the expected tool (the detected profile corresponds to the expected and predetermined profile) and therefore makes it possible to prevent mounting a tool in an inadequate state on the toolholder 310.

In one embodiment there is proposed a machine tool equipped with a machining module as described, that machine tool in particular also including a unit 306 for tracking the wear of the tool (FIG. 1) that is able to calculate the deviation of the profile of the tool on the basis of information supplied by said unit 304 for detecting the profile of the tool 312. In particular, in this machine tool said unit 306 for tracking the wear of the tool, if said deviation of the profile of the end portion 313 of the tool 312 exceeds a predetermined deviation, enables the modified profile (new profile) of said end portion 313 of the tool 312 mounted on the toolholder 310, detected by said detection unit 304, to be used to recalculate the machining parameters. Those machining parameters include in particular information for moving the toolholder 310 that is transmitted to said control unit 302 of the toolholder. In particular, if this deviation of the profile exceeds a threshold deviation then the information linked to the new profile of the tool is used to recalculate the machining parameters including modified information for moving the toolholder 310 that is transmitted to said control unit 302 of the toolholder. Said control unit 302 of the toolholder therefore receives this modified information, which enables it to adapt the machining steps as a function of the measurement of the profile of the tool by the detection unit 304.

Figure 17:
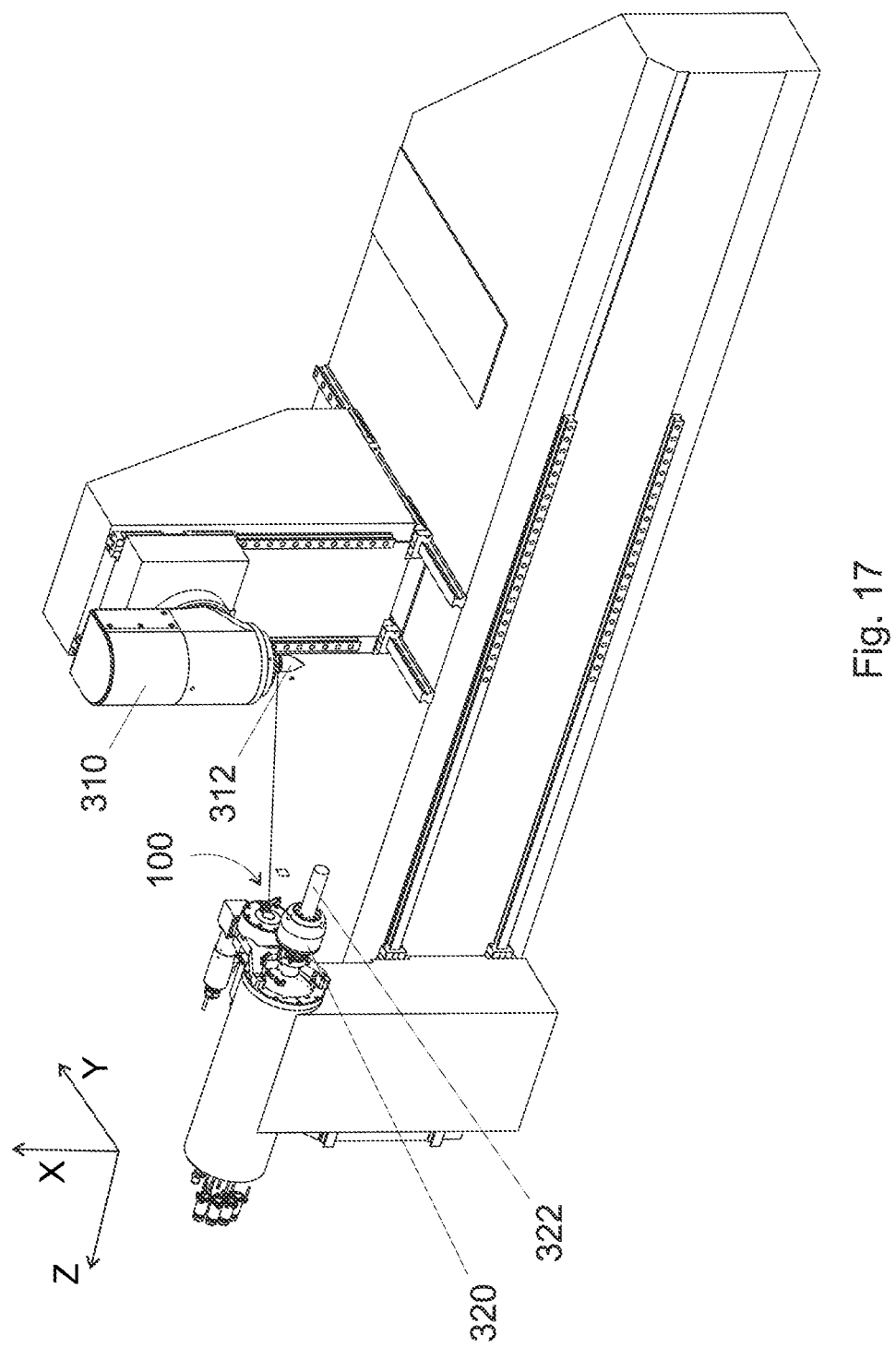
FIG. 17 is a perspective view of part of a machining module in accordance with another embodiment of the invention.
Figure 18:
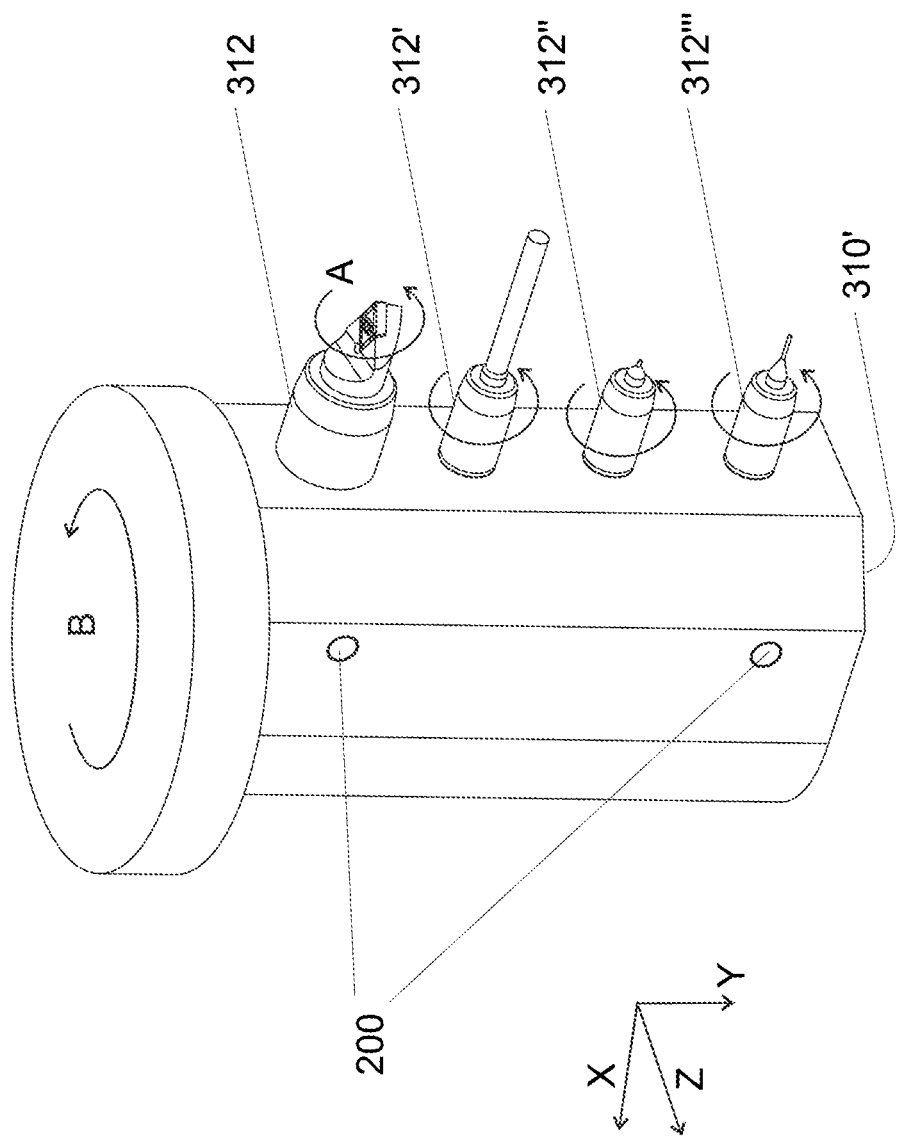
FIG. 18 is a perspective view of a variant toolholder carrying a series of tools aligned vertically, each tool being oriented along a horizontal axis about which it is mounted to rotate.
Figure 19:
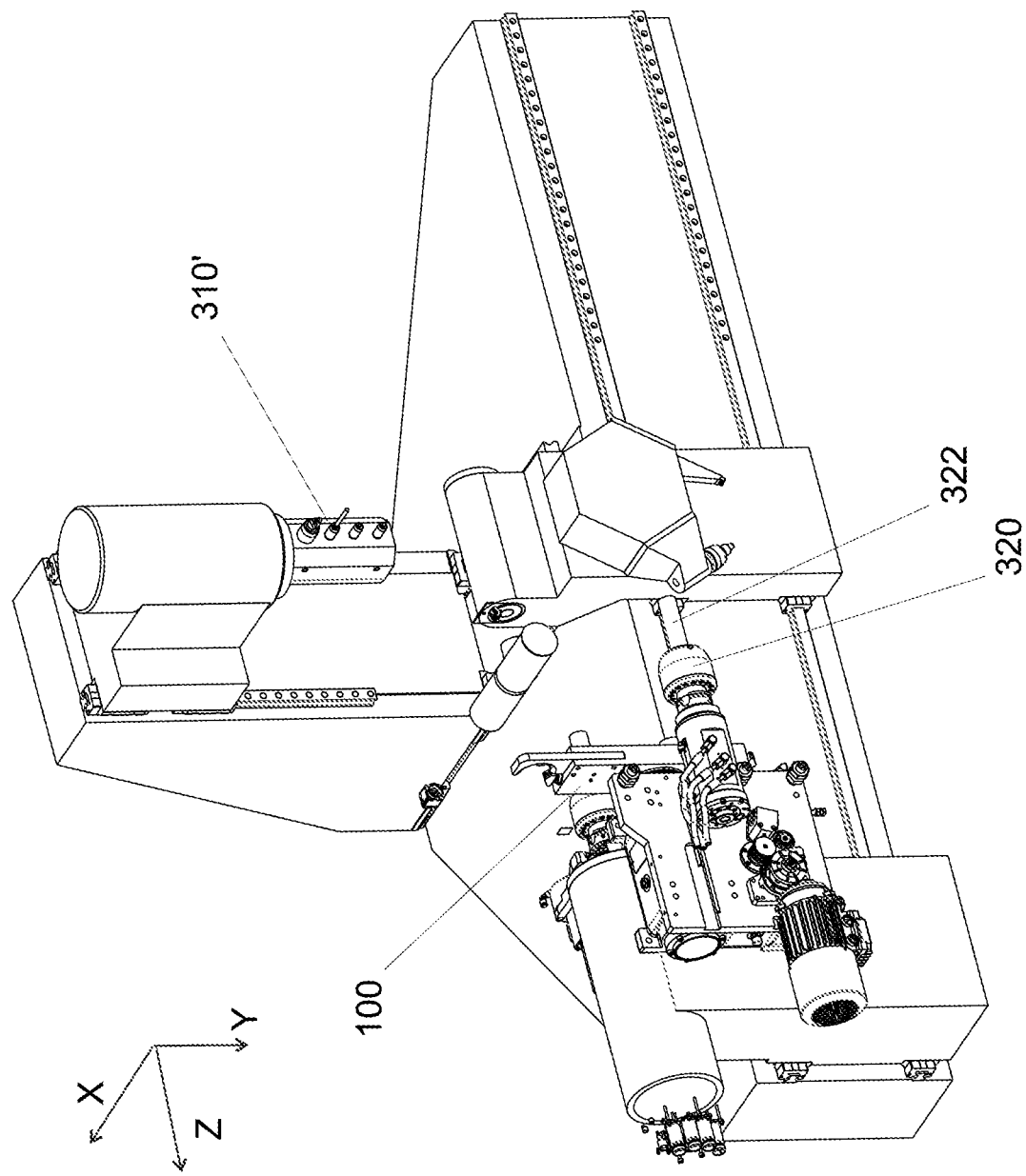
FIG. 19 is a perspective view of a machining module in accordance with a further embodiment of the invention.

The foregoing descriptions and explanations have been given for an embodiment of the machining module 300 with a toolholder 310 extending along the axis X, which is horizontal, with an axis Y of the machining module 300 that is vertical, with a tool 312 rotating about an axis parallel to the axis X, and a toolholder 310 mobile along the axis X. According to another embodiment seen in FIG. 17, there is used in accordance with the invention a machining module 300 with a toolholder 310 extending along the axis X, which is vertical, with an axis Y of the machining module 300 which is horizontal, still with a tool 312 rotating about an axis parallel to the axis X, and a toolholder 310 mobile along the axis X. According to another embodiment seen in FIGS. 18 and 19, there is used in accordance with the invention a machining module 300 with a toolholder 310' carrying a series of tools 312, 312', 312", 312'" parallel to one another and aligned in the (vertical) direction Y. Each tool 312, 312', 312", 312'" of the series of tools extends along the axis X, which is horizontal, each tool 312, 312', 312", 312'" rotating (arrow A) about an axis parallel to the axis X via a rotary part of the toolholder 310' (for example a spindle) that carries one of the tools 312, 312', 312", 312'"; the toolholder 310' being mobile in translation along the axis X and along the axis Y, and preferably also mobile in rotation about the vertical axis Y (arrow B). This embodiment enables machining to continue by going from one to another of the tools 312, 312', 312", 312'". In this case, the toolholder 310' is also equipped with a (at least one) target 200, possibly associated with an RFID microchip as described above. In this case, represented in FIG. 18, two targets 200 are disposed on the rear part of the toolholder 310' that does not rotate about an axis parallel to the axis X. Although this is not shown, a target 200 could be provided for each tool 312, 312', 312", 312'" at the level of the rotary part of the toolholder 310' (for example a spindle) that carries one of the tools 312, 312', 312", 312'".

REFERENCE NUMBERS EMPLOYED IN THE FIGURES

X Vertical direction (first transverse axis)
Y Lateral horizontal direction (second transverse axis)
Z Main horizontal direction (main axis)
C1 Diagonal
C2 Diagonal
C3 Centre
a Angle of the inclined face
R Arrow for the rotation of the toolholder and of the target
Optical device
100 Optical system
Optical axis
102 Entry face of the optical system
104 Annular front light source
106 Rear light source
110 First image capture system
DOF1 Depth of field of the first image capture system
F1 Image focal plane of the first image capture system
112 First image acquisition system
116 Optical path of the first image capture system
120 Second image capture system
F2 Image focal plane of the second image capture system
DOF2 Depth of field of the second image capture system
122 Second image acquisition system
126 Optical path of the second image capture system
128 Optical module with catadioptric optical system
129 Mirror
130 Third image capture system
140 Light source (lateral illumination)
200 Three-dimensional target
202 Active face 210 First structure
212 Reference face
214 First portion (diffusely reflective surface)
216 Second portion (specularly reflective surface)
217 Localized zones
218 Opening
219 Housing
220 Second structure
222 Inclined face
224 Elements in relief
225 Specular elements
230 Transparent protective plate
231 Bottom wall
232 Plate
233 Reflective layer
234 Cylindrical wall
300 Machining module
302 Control unit of the toolholder
304 Unit for detection of the profile of the tool
306 Unit for tracking the wear of the tool
308 Control unit of the part support
310 Toolholder
310' Multi-spindle toolholder
312 Tool
312' Tool
312" Tool
312'" Tool
313 End portion of the tool
313A Wear zone
314 X marker on the toolholder
316 Y marker on the toolholder
320 Part support or material spindle
322 Part to be machined (material)

What is claimed is:

1. Material removing machining module for a machine tool comprising:
    a part support intended to receive a part to be machined;
    a control unit of the part support adapted to control and to modify the position of the part support in the machining module;
    a toolholder intended to receive a tool having an end portion used for machining the part mounted on the part support;
    a control unit of the toolholder adapted to control and to modify the position of the toolholder in the machining module; and
    a unit for detecting the profile of the tool mounted on the toolholder, said detection unit comprising an optical system for determining the profile of said end portion of the tool mounted on the toolholder,
    wherein said optical system is mounted on the part support,
    wherein said machining module further includes a target that is part of the optical device, said target being mounted on the toolholder and including an active face forming a positioning reference adapted to be moved on the optical axis (O) of the optical system when the toolholder is in a predetermined angular position about its axis (X) and in a predetermined axial position along its axis (X), forming a position referencing the toolholder relative to the part support,
    wherein the target is a three-dimensional target including on an active face:
        a first structure defining a plane reference face, and
        a second structure having a face inclined relative to said plane reference face, and
    wherein said optical system comprises a first image capture system and a second image capture system, wherein the difference between the focal distance of the second image capture system and the focal distance of the first image capture system is between the minimum distance and the maximum distance inclusive separating the reference face from the inclined face.

2. Machining module according to claim 1, wherein said optical system is configured to enable detection of said profile when the toolholder is in a measuring operational position.

3. Machining module according to claim 2, wherein said optical system includes a first image capture system that is configured so that its image focal plane is able to intersect the end portion of the tool in said measuring operational position.

4. Machining module according to claim 1, wherein said optical system has an optical axis (O) orthogonal to the direction of the axis X of the toolholder.

5. Machining module according to claim 1, wherein the optical system is part of a measuring optical device that is configured to enable determination by a single step of image capture by the optical system determination of the three-dimensional relative position between the support of the part to be machined and the toolholder.

6. Machining module according to claim 5, wherein said measuring optical device is configured also to enable by a single step of image capture of the end portion of the tool mounted on the toolholder by the optical system determination of the profile of the end portion of the tool mounted on the toolholder.

7. Machining module according to claim 5, wherein said measuring optical device further includes a front light source oriented parallel to the optical axis (O) of the optical system and in the direction of the toolholder.

8. Machining module according to claim 5, wherein said measuring optical device further includes a rear light source oriented in the direction of the optical system.

9. Machining module according to claim 1, wherein said measuring optical device further includes a light source oriented in the direction of the toolholder, said light source being disposed so as to provide lateral illumination of the three-dimensional target.

10. Machining module according to claim 1,
    wherein the optical system comprises a first image capture system and a second image capture system,
    wherein the depth of field of the first image capture system is at least ten times greater than the depth of field of the second image capture system, and
    wherein the optical system is arranged so that the optical path of the first image capture system and the optical path of the second image capture system have a common section placed on the optical axis (O) of the optical system and including the image focal plane of the first image capture system and the image focal plane of the second image capture system.

11. Machining module according to claim 1,
    wherein the optical system further comprises a second image capture system,
    wherein the depth of field of the first image capture system is at least ten times greater than the depth of field of the second image capture system,
    wherein the optical system is arranged so that the optical path of the first image capture system and the optical path of the second image capture system have a common section placed on the optical axis (O) of the optical system and including the image focal plane of the first image capture system and the image focal plane of the second image capture system, wherein the first image capture system is configured so that its image focal plane is able to correspond to the reference plane of the first structure, and wherein the second image capture system is configured so that its image focal plane is able to intersect the inclined face of the three-dimensional target.

12. Machining module according to claim 1, wherein the optical device further includes a third image capture system disposed on the toolholder and configured to identify the angular orientation of the toolholder about its axis (X).

13. Machine tool including a machining module according to claim 1, said machine tool further including a unit for tracking the wear of the tool that is able to calculate the deviation of the profile of the tool from information supplied by said detection unit.

14. Machine tool according to claim 13, wherein said unit for tracking the wear of the tool enables, when said deviation of the profile of the tool exceeds a predetermined deviation, use of the modified profile of said end portion of the tool mounted on the toolholder, detected by said detection unit, to recalculate the machining parameters, said machining parameters including information for the movement of the toolholder that is transmitted to said control unit of the toolholder.

* * * * *